US012656772B2

(12) United States Patent
Cui et al.

(10) Patent No.: US 12,656,772 B2
(45) Date of Patent: Jun. 16, 2026

(54) COMPETITIVE AND COLLABORATIVE AUTONOMOUS VEHICLE TASK PERFORMANCE

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Sameena Khan, Peachtree Corners, GA (US); Troy Paige, Buford, GA (US); Ari Craine, Marietta, GA (US); Robert Koch, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 155 days.

(21) Appl. No.: 18/310,264

(22) Filed: May 1, 2023

(65) Prior Publication Data

US 2024/0028028 A1    Jan. 25, 2024

Related U.S. Application Data

(63) Continuation of application No. 17/107,653, filed on Nov. 30, 2020, now abandoned.

(51) Int. Cl.
*G05D 1/00* (2024.01)
*B60W 60/00* (2020.01)
(Continued)

(52) U.S. Cl.
CPC ......... *G05D 1/0027* (2013.01); *B60W 60/001* (2020.02); *G05D 1/0022* (2013.01); *G08G 1/20* (2013.01); *H04W 4/40* (2018.02)

(58) Field of Classification Search
CPC . G05D 1/0027; G05D 1/0022; B60W 60/001; G08G 1/20; G08G 1/202;
(Continued)

(56) References Cited

U.S. PATENT DOCUMENTS

| | | | |
|---|---|---|---|
| 5,295,551 A | 3/1994 | Sukonick | |
| 5,636,123 A | 6/1997 | Rich et al. | |
| | (Continued) | | |

FOREIGN PATENT DOCUMENTS

| | | | | |
|---|---|---|---|---|
| CN | 105278759 B | 1/2016 | | |
| CN | 107466469 A | * 12/2017 | ........... | H04L 67/025 |
| | (Continued) | | | |

OTHER PUBLICATIONS

Machine translation of CN-107466469-A (Year: 2017).*
(Continued)

*Primary Examiner* — Navid Z. Mehdizadeh
*Assistant Examiner* — Caitlin R Mccleary

(57) ABSTRACT

A processing system including at least one processor may obtain a request for a performance of a task, where the task is to be performed by at least one autonomous vehicle, broadcast an offer for performing the task to a plurality of autonomous vehicles, obtain from a first autonomous vehicle of the plurality of autonomous vehicles, a bid to perform the task by the first autonomous vehicle and at least a second autonomous vehicle, and assign the task to the first autonomous vehicle and the at least the second autonomous vehicle in response to the bid.

20 Claims, 5 Drawing Sheets

(51) Int. Cl.
  *G08G 1/00* (2006.01)
  *H04W 4/40* (2018.01)

(58) Field of Classification Search
  CPC .......... H04W 4/40; H04W 4/46; G06Q 10/02;
          G06Q 10/0631; G06Q 10/08
  See application file for complete search history.

(56) References Cited

U.S. PATENT DOCUMENTS

| | | | |
|---|---|---|---|
| 7,415,331 | B2 | 8/2008 | Dapp et al. |
| 7,451,023 | B2 | 11/2008 | Appleby et al. |
| 7,737,878 | B2 | 6/2010 | Van Tooren et al. |
| 8,914,182 | B2 | 12/2014 | Casado et al. |
| 8,948,935 | B1 | 2/2015 | Peeters et al. |
| 9,169,030 | B2 | 10/2015 | Wong et al. |
| 9,317,034 | B2 | 4/2016 | Hoffman et al. |
| 9,405,181 | B2 | 8/2016 | Wong et al. |
| 9,464,907 | B1 | 10/2016 | Hoareau et al. |
| 9,523,986 | B1 | 12/2016 | Abebe et al. |
| 9,567,077 | B2 | 2/2017 | Mullan et al. |
| 9,691,285 | B2 | 6/2017 | Jarrell |
| 9,713,675 | B2 | 7/2017 | Levien et al. |
| 9,720,519 | B2 | 8/2017 | Verma |
| 9,754,496 | B2 | 9/2017 | Chan et al. |
| 9,760,087 | B2 | 9/2017 | Hoareau et al. |
| 9,798,329 | B2 | 10/2017 | Shattil |
| 9,835,709 | B2 | 12/2017 | Tran et al. |
| 9,848,459 | B2 | 12/2017 | Darrow et al. |
| 9,854,206 | B1 | 12/2017 | Ren et al. |
| 9,861,075 | B2 | 1/2018 | Shen et al. |
| 9,896,202 | B2 | 2/2018 | Jourdan |
| 9,940,525 | B2 | 4/2018 | Wolf |
| 9,943,965 | B2 | 4/2018 | Moore |
| 9,977,428 | B2 | 5/2018 | Hall |
| 9,984,579 | B1 | 5/2018 | Harris et al. |
| 9,986,378 | B2 | 5/2018 | Jones |
| 10,050,760 | B2 | 8/2018 | Ross et al. |
| 10,073,336 | B2 | 9/2018 | Maes et al. |
| 10,155,166 | B1 | 12/2018 | Taylor et al. |
| 10,159,218 | B2 | 12/2018 | Shen et al. |
| 10,203,701 | B2 | 2/2019 | Kurdi et al. |
| 10,254,766 | B2 | 4/2019 | High et al. |
| 10,269,257 | B1 | 4/2019 | Gohl et al. |
| 10,274,952 | B2 | 4/2019 | Cantrell et al. |
| 10,308,430 | B1 | 6/2019 | Brady et al. |
| 10,313,638 | B1 | 6/2019 | Yeturu et al. |
| 10,325,506 | B2 | 6/2019 | Goddemeier et al. |
| 10,331,124 | B2 | 6/2019 | Ferguson et al. |
| 10,332,394 | B2 | 6/2019 | Gomez Gutierrez et al. |
| 10,354,537 | B2 | 7/2019 | Beaurepaire et al. |
| 10,372,122 | B2 | 8/2019 | Zach |
| 10,440,229 | B2 | 10/2019 | Drako |
| 10,441,020 | B1 | 10/2019 | Andon et al. |
| 10,453,345 | B2 | 10/2019 | Greenberger et al. |
| 10,467,885 | B2 | 11/2019 | Trundle et al. |
| 10,481,600 | B2 | 11/2019 | Yen et al. |
| 10,501,180 | B2 | 12/2019 | Yu |
| 10,565,395 | B2 | 2/2020 | Matusek et al. |
| 10,586,464 | B2 | 3/2020 | Dupray et al. |
| 10,600,326 | B2 | 3/2020 | Kim et al. |
| 10,607,462 | B2 | 3/2020 | Drako |
| 10,636,297 | B2 | 4/2020 | Wang et al. |
| 10,643,406 | B2 | 5/2020 | Arya et al. |
| 10,654,482 | B2 | 5/2020 | Urano et al. |
| 10,655,968 | B2 | 5/2020 | Rezvani |
| 10,672,278 | B2 | 6/2020 | Deluca et al. |
| 10,676,022 | B2 | 6/2020 | Zevenbergen et al. |
| 10,683,088 | B2 | 6/2020 | Erickson et al. |
| 10,706,634 | B1 | 7/2020 | Baumbach et al. |
| 10,748,429 | B2 | 8/2020 | Bosworth |
| 10,761,544 | B2 | 9/2020 | Anderson et al. |
| 10,762,795 | B2 | 9/2020 | Contreras et al. |
| 10,762,797 | B2 | 9/2020 | Navot et al. |
| 10,765,378 | B2 | 9/2020 | Hall et al. |
| 10,818,187 | B2 | 10/2020 | Perko |

| | | | |
|---|---|---|---|
| 11,155,247 | B1* | 10/2021 | Ebrahimi Afrouzi ....................... B62D 33/0636 |
| 11,360,757 | B1* | 6/2022 | Roy ........................ H04L 67/06 |
| 2005/0124292 | A1* | 6/2005 | Holloway ............... H04W 4/06 455/446 |
| 2005/0259150 | A1 | 11/2005 | Furumi et al. |
| 2007/0288132 | A1 | 12/2007 | Lam |
| 2014/0358605 | A1* | 12/2014 | Balamurugan .. G06Q 10/06311 705/7.13 |
| 2014/0365258 | A1* | 12/2014 | Vestal ........... G06Q 10/063114 901/1 |
| 2015/0202770 | A1 | 7/2015 | Patron et al. |
| 2015/0269258 | A1 | 9/2015 | Hunt, Jr. |
| 2015/0350614 | A1 | 12/2015 | Meier et al. |
| 2016/0214717 | A1 | 7/2016 | De Silva |
| 2016/0246297 | A1 | 8/2016 | Song |
| 2016/0373699 | A1 | 12/2016 | Torres et al. |
| 2017/0081026 | A1 | 3/2017 | Winn et al. |
| 2017/0278409 | A1 | 9/2017 | Johnson et al. |
| 2017/0291608 | A1 | 10/2017 | Engel et al. |
| 2017/0368413 | A1 | 12/2017 | Shavit |
| 2018/0035606 | A1 | 2/2018 | Burdoucci |
| 2018/0052352 | A1 | 2/2018 | Sasaki |
| 2018/0072416 | A1 | 3/2018 | Cantrell et al. |
| 2018/0136659 | A1 | 5/2018 | Matloff |
| 2018/0162504 | A1 | 6/2018 | Lindsø |
| 2018/0232580 | A1 | 8/2018 | Wolf |
| 2018/0259960 | A1 | 9/2018 | Cuban et al. |
| 2018/0308130 | A1 | 10/2018 | Hafeez et al. |
| 2018/0326581 | A1* | 11/2018 | Baroudi ................. G06N 5/048 |
| 2018/0326583 | A1* | 11/2018 | Baroudi ................. B25J 9/1661 |
| 2019/0035128 | A1 | 1/2019 | Russell |
| 2019/0051224 | A1 | 2/2019 | Marshall et al. |
| 2019/0052852 | A1 | 2/2019 | Schick et al. |
| 2019/0061942 | A1 | 2/2019 | Miller |
| 2019/0112048 | A1 | 4/2019 | Culver |
| 2019/0135450 | A1 | 5/2019 | Zhou et al. |
| 2019/0185158 | A1 | 6/2019 | Blake et al. |
| 2019/0197254 | A1 | 6/2019 | Salgar |
| 2019/0227557 | A1 | 7/2019 | Kim et al. |
| 2019/0238338 | A1 | 8/2019 | OBrien et al. |
| 2019/0287063 | A1 | 9/2019 | Skaaksrud et al. |
| 2019/0324456 | A1 | 10/2019 | Ryan et al. |
| 2019/0339712 | A1 | 11/2019 | Williams et al. |
| 2019/0369641 | A1 | 12/2019 | Gillett |
| 2019/0377345 | A1 | 12/2019 | Bachrach et al. |
| 2020/0014759 | A1 | 1/2020 | Wunderlich |
| 2020/0032484 | A1 | 1/2020 | ODonnell |
| 2020/0042013 | A1 | 2/2020 | Kelkar et al. |
| 2020/0043347 | A1 | 2/2020 | Wartofsky |
| 2020/0066147 | A1 | 2/2020 | Vadillo et al. |
| 2020/0066163 | A1 | 2/2020 | Emsbach et al. |
| 2020/0082731 | A1 | 3/2020 | Choi et al. |
| 2020/0094964 | A1 | 3/2020 | Myslinski |
| 2020/0103882 | A1 | 4/2020 | Sullivan et al. |
| 2020/0130827 | A1 | 4/2020 | Kozak |
| 2020/0145619 | A1 | 5/2020 | Drako |
| 2020/0183384 | A1 | 6/2020 | Noh et al. |
| 2020/0207371 | A1 | 7/2020 | Dougherty et al. |
| 2020/0250848 | A1 | 8/2020 | Kim et al. |
| 2020/0262450 | A1 | 8/2020 | Pan |
| 2020/0265701 | A1 | 8/2020 | Schenker et al. |
| 2020/0265723 | A1 | 8/2020 | Gordon et al. |
| 2020/0273353 | A1 | 8/2020 | OConnell et al. |
| 2020/0341471 | A1 | 10/2020 | Kozak |
| 2020/0356115 | A1 | 11/2020 | Kubie |
| 2020/0357288 | A1 | 11/2020 | Stewart et al. |
| 2021/0247776 | A1* | 8/2021 | Faye .................... H04L 9/3271 |

FOREIGN PATENT DOCUMENTS

| | | |
|---|---|---|
| CN | 107945103 A | 4/2018 |
| EP | 3525157 A1 | 8/2019 |
| EP | 3667451 A1 | 6/2020 |
| KR | 102160722 B1 | 9/2020 |
| TW | I693959 B | 5/2020 |
| WO | 2016210156 A1 | 12/2016 |
| WO | 2017055080 A1 | 4/2017 |

(56) References Cited

FOREIGN PATENT DOCUMENTS

| WO | 2017065107 A1 | 4/2017 |
|---|---|---|
| WO | 2017068224 A1 | 4/2017 |
| WO | 2017157863 A1 | 9/2017 |
| WO | 2018052352 A1 | 3/2018 |
| WO | 2019006769 A1 | 1/2019 |
| WO | 2019235667 A1 | 12/2019 |
| WO | 2020057887 A1 | 3/2020 |
| WO | 2020072387 A1 | 4/2020 |

OTHER PUBLICATIONS

Mueller, et al., "Jogging with a Quadcopter", CHI 2015, Apr. 18, 2015, exertiongameslab.org, downloaded from http://exertiongameslab.org/wp-content/uploads/2011/07/quadcopter_chi2015.pdf, 10 pages.
Graether, et al., Joggobot: A Flying Robot as Jogging Companion, CHI 2012, May 5, 2012, exertiongameslab.org downloaded from https://exertiongameslab.org/wp-content/uploads/2011/07/joggobot_chi2012.pdf, pp. 263-264.
Al Zayer, Majed, et al. "Exploring the Use of a Drone to Guide Blind Runners", Proceedings of the 18th International ACM SIGACCESS Conference on Computers and Accessibility, 2016, downloaded from https://ml.cse.unr.edu/media/documents/2016/p263-al-zayer.pdf.
Alshareef, Hazzaa N., and Dan Grigoras. "An adaptive task scheduler for a cloud of drones", 2018 4th International Conference on Cloud Computing Technologies and Applications (Cloudtech), IEEE, Nov. 2018, 9 pages.
Altawy, Riham and Youssef, Amr. M., "Security, Privacy, and Safety Aspects of Civilian Drones: A Survey", researchgate.net, ACM Transactions on Cyber-Physical Systems, Nov. 2016, 25 pages.
Amato, Andrew, "Projector Drone Turns Any Surface Into a Video Screen," DRONELIFE.com, dronelife.com, Jun. 26, 2014, 2 pages, downloaded from https://web.archive.org/web/20140804122610/https://dronelife.com/2014/06/26/projector-drone-turns-surface-video-screen/.
Bertram, Joshua R., Peng Wei, and Joseph Zambreno. "Scalable FastMDP for Pre-departure Airspace Reservation and Strategic De-conflict." arXiv preprint arXiv:2008.03518 (2020).
Blank, Peter; Kirrane, Sabrina; and Spiekerman, Sarah. "Privacy-Aware Restricted Areas for Unmanned Aerial Systems", computer.org. IEEE Computer and Reliability Societies, Mar./Apr. 2018, vol. 16, pp. 70-79.
Brock, Anke M., et al. "FlyMap: Interacting with Maps Projected from a Drone", Proceedings of the 7th ACM International Symposium on Pervasive Displays. 2018, 9 pages.
Bui, Khac-Hoai Nam, and Jason J. Jung, "Internet of agents framework for connected vehicles: A case study on distributed traffic control system", J. Parallel Distrib. Comput., (2017) , 26 pages.
Cameron, Lori, "Building a Framework to Protect Your Privacy from Drones," computer.org. Accessed, Nov. 10, 2020, IEEE Computer Society, (2020), 2 pages.
Choi, Han-Lim, Luc Brunet, and Jonathan P. How, "Consensus-Based Decentralized Auctions for Robust Task Allocation", Robotics, IEEE Transactions on Robotics 25.4 (2009): 912-926.
Colley, Ashley, et al. "Investigating Drone Motion as Pedestrian Guidance", Proceedings of the 16th International Conference on Mobile and Ubiquitous Multimedia, 2017, 9 pages.
Frias-Martinez, Vanessa, Elizabeth Sklar, and Simon Parsons, "Exploring auction mechanisms for role assignment in teams of autonomous robots," Robot Soccer World Cup. Springer, Berlin, Heidelberg, 2004. 12 pages.
Irfan, Muhammad, and Adil Farooq, "Auction-based Task Allocation Scheme for Dynamic Coalition Formations in Limited Robotic Swarms with Heterogeneous Capabilities," 2016 International Conference on Intelligent Systems Engineering(ICISE). IEEE, 2016.
Isop, W., Pestana, J., Ermacora, G., Fraundorfer, F. & Schmalstieg, D., "Micro Aerial Projector—Stabilizing Projected Images Of An Airborne Robotics Projection Platform", 2016 IEEE/RSJ International conference on Intelligent Robots and Systems (IROS), Daejeon convention Center, Oct. 2016, pp. 5618-5625.
Kamali, Maryam, et al. "Formal verification of autonomous vehicle platooning", Science of Computer Programming 148 (2017), 88-106 19 pages.
Lee, Eun-Kyu, et al., "Internet of Vehicles: From intelligent grid to autonomous cars and vehicular fogs", International Journal of Distributed Sensor Networks, vol. 12, No. 9, (2016), 14 pages.
Lucien, Laurent, et al., "A Proposition of Data Organization and Exchanges to Collaborate in an Autonomous Agent context", 2016 IEEE Intl Conference on Computational Science and Engineering (CSE) and IEEE Intl Conference on Embedded and Ubiquitous Computing (EUC) and 15th Intl Symposium on Distributed Computing and Applications for Business Engineering (DCABES), IEEE, 2016, 8 pages.
Minaeian, S., Liu, J., & Son, Y. (2018). Effective and Efficient Detection of Moving Targets From a UAV's Camera. IEEE Transactions on Intelligent Transportation Systems, vol. 19, No. 2, Feb. 2018, pp. 497-506.
Pongpunwattana, Anawat, and Rolf Rysdyk. "Real-time planning for multiple autonomous vehicles in dynamic uncertain environments." Journal of Aerospace Computing, Information, and Communication 1.12 (2004): 580-604.
Porfiri, Maurizio, D. Gray Roberson, and Daniel J. Stilwell, "Tracking and Formation Control of Multiple Autonomous Agents: A two-level consensus approach", Automatica vol. 43, No. 8 (2007), pp. 1318-1328.
Raboin, Eric, et al. "Model-predictive asset guarding by team of autonomous surface vehicles in environment with civilian boats", Autonomous Robots 38.3 (2015), pp. 261-282.
Scheible, J. Funk, M. (2016). In-Situ-DisplayDrone: Facilitating Co-located Interactive Experiences via A Flying Screen, In Proceedings of the 5th ACM International Symposium on Pervasive Displays (PerDis '16). Association for Computing Machinery, 251-252.
Scheible, Jurgen, et al. "Displaydrone: A Flying Robot Based Interactive Display", Proceedings of the 2nd ACM International Symposium on Pervasive Displays, 2013, 6 pages.
Schneider, Eric, et al. "Auction-based task allocation for multi-robot teams in dynamic environments." Conference Towards Autonomous Robotic Systems. Springer, Cham, 2015.
Xiang, Xianbo, Bruno Jouvencel, and Olivier Parodi, "Coordinated Formation Control of Multiple Autonomous Underwater Vehicles for Pipeline Inspection", International Journal of Advanced Robotic Systems, vol. 7, No. 1 (2010), pp. 075-084.
Yaacoub, Jean-Paul et al., "Security analysis of drones systems: Attacks, limitations, and recommendations", Internet of Things 11, 2020, 40 pages.
Yu, Jun, et al. "iPrivacy: image privacy protection by identifying sensitive objects via deep multi-task learning." IEEE Transactions on Information Forensics and Security, vol. 12, No. 5, (2017): 1005-1016.
Zhu, Guodong, and Peng Wei. "Pre-Departure Planning for Urban Air Mobility Flights with Dynamic Airspace Reservation", AIAA Aviation 2019 Forum, 2019, 11 pages, downloaded from https://cpb-us-W2.wpmucdn.com/web.seas.gwu.edu/dist/9/15/files/2019/07/aviation19_PredeparturePlanning.pdf.
Dias, M Bernadine, "TraderBots: A New Paradigm for Robust and Efficient Multirobot Coordination in Dynamic Environments",Jan. 2004, The Robotics Institute Carnegie Mellon University, 34, 35, 48 (Year: 2004).

* cited by examiner

FIG. 2

| AV CAPABILITIES | Aerial | Max Speed | UV Light | Infrared Cam | Max Payload | Collision Avoidance | Stealth | Security Level | Defensive Maneuvers | Collaborative |
|---|---|---|---|---|---|---|---|---|---|---|
| AV1 | Yes | 25mph | No | No | 7 lbs | Yes | No | Yes | Yes | Yes |
| AV2 | Yes | 30 mph | No | Yes | 15 lbs | No | No | No | No | Yes |
| AV3 | No | 60 mph | No | No | 200 lbs | Yes | No | No | No | Yes |

210

| TASK REQUEST | Aerial | ETA | Max Speed | UV Light | Payload | Collision Avoidance | Stealth | Security Level | Defensive Maneuvers | Task Location | Task Destination Location |
|---|---|---|---|---|---|---|---|---|---|---|---|
| TASK 1 | Yes | 9:00 | 25 mph | No | NA | No | N/A | Yes | Yes | 33.9851868 -84.238417 | 43.9851868 -64.238417 |
| TASK 2 | Yes | 10:00 | 15 mph | No | 10 lbs | Yes | No | Yes | No | 34.9851868 -84.238417 | 43.9851868 -64.238417 |

200

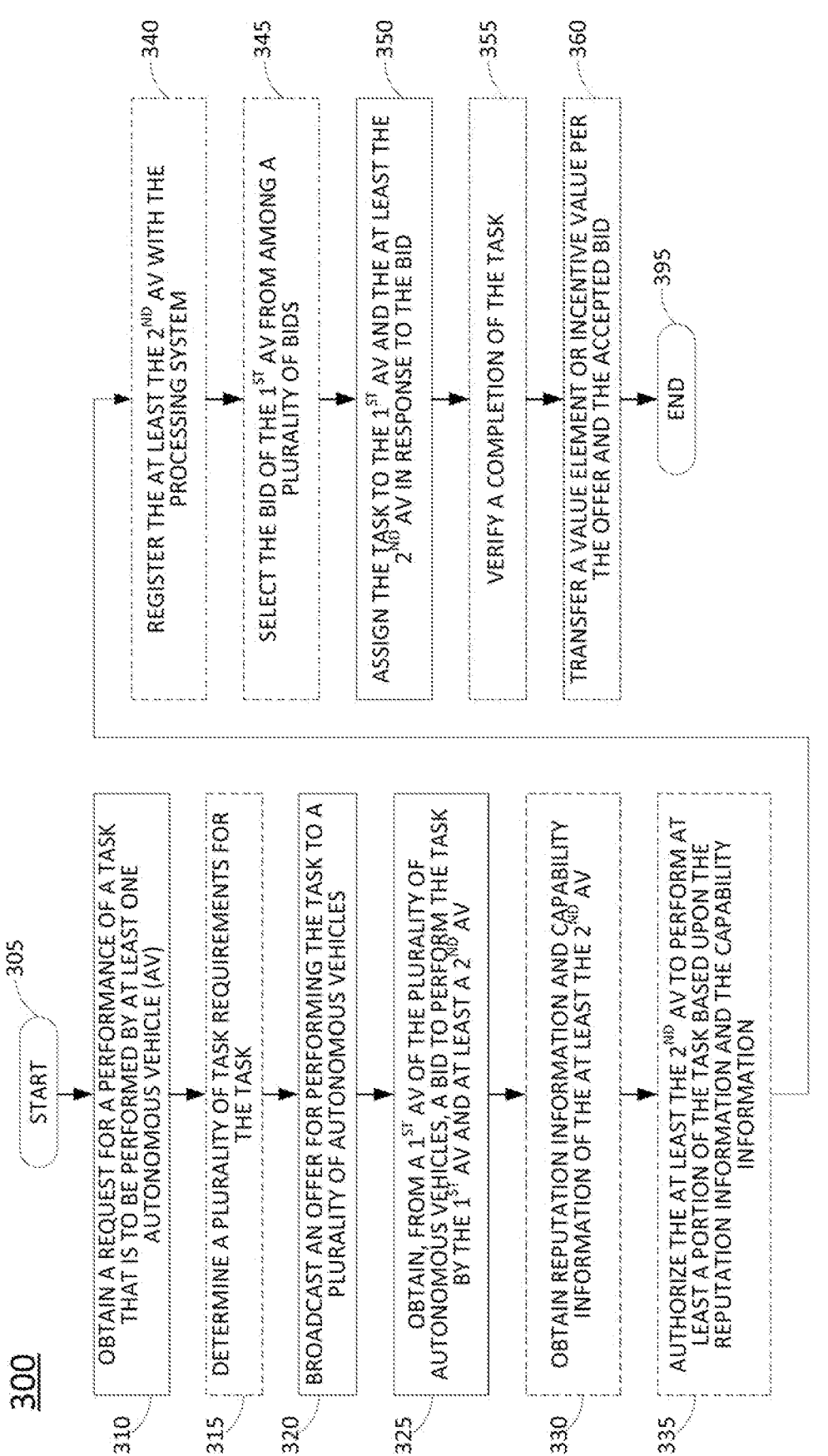

300

305 START

310 OBTAIN A REQUEST FOR A PERFORMANCE OF A TASK THAT IS TO BE PERFORMED BY AT LEAST ONE AUTONOMOUS VEHICLE (AV)

315 DETERMINE A PLURALITY OF TASK REQUIREMENTS FOR THE TASK

320 BROADCAST AN OFFER FOR PERFORMING THE TASK TO A PLURALITY OF AUTONOMOUS VEHICLES

325 OBTAIN, FROM A 1ST AV OF THE PLURALITY OF AUTONOMOUS VEHICLES, A BID TO PERFORM THE TASK BY THE 1ST AV AND AT LEAST A 2ND AV

330 OBTAIN REPUTATION INFORMATION AND CAPABILITY INFORMATION OF THE AT LEAST THE 2ND AV

335 AUTHORIZE THE AT LEAST THE 2ND AV TO PERFORM AT LEAST A PORTION OF THE TASK BASED UPON THE REPUTATION INFORMATION AND THE CAPABILITY INFORMATION

340 REGISTER THE AT LEAST THE 2ND AV WITH THE PROCESSING SYSTEM

345 SELECT THE BID OF THE 1ST AV FROM AMONG A PLURALITY OF BIDS

350 ASSIGN THE TASK TO THE 1ST AV AND THE AT LEAST THE 2ND AV IN RESPONSE TO THE BID

355 VERIFY A COMPLETION OF THE TASK

360 TRANSFER A VALUE ELEMENT OR INCENTIVE VALUE PER THE OFFER AND THE ACCEPTED BID

395 END

MODULE
505

I/O DEVICES, E.G.,
STORAGE DEVICE
506

PROCESSOR
502

MEMORY
504

COMPETITIVE AND COLLABORATIVE AUTONOMOUS VEHICLE TASK PERFORMANCE

This application is a continuation of U.S. patent application Ser. No. 17/107,653, filed on Nov. 30, 2020, which is herein incorporated by reference in its entirety.

The present disclosure relates generally to autonomous vehicle operations, and more particularly to methods, computer-readable media, and apparatuses for assigning a task to a first autonomous vehicle and at least a second autonomous vehicle in response to a bid from the first autonomous vehicle, and to methods, computer-readable media, and apparatuses for a first autonomous vehicle to instruct a second autonomous vehicle to perform at least a part of at least a portion of a task, in response to a bid from at least a second autonomous vehicle.

BACKGROUND

Current trends in wireless technology are leading towards a future where virtually any object can be network enabled and Internet Protocol (IP) addressable. The pervasive presence of wireless networks, including cellular, Wi-Fi, Zig-Bee, satellite and Bluetooth networks, and the migration to a 128-bit IPv6-based address space provides the tools and resources for the paradigm of the Internet of Things (IoT) to become a reality. In addition, drones or autonomous aerial vehicles (AAVs), which were once primarily recreational or experimental items, are increasingly being utilized for a variety of commercial and other useful tasks, such as package deliveries, search and rescue, mapping, surveying, and so forth.

SUMMARY

In one example, the present disclosure describes a method, computer-readable medium, and apparatus for assigning a task to a first autonomous vehicle and at least a second autonomous vehicle in response to a bid from the first autonomous vehicle. For instance, in one example, a processing system including at least one processor may obtain a request for a performance of a task, where the task is to be performed by at least one autonomous vehicle, broadcast an offer for performing the task to a plurality of autonomous vehicles, obtain from at least the first autonomous vehicle of the plurality of autonomous vehicles, a bid to perform the task by the first autonomous vehicle and at least a second autonomous vehicle, and assign, by the processing system, the task to the first autonomous vehicle and the at least the second autonomous vehicle in response to the bid.

In another example, the present disclosure describes a method, computer-readable medium, and apparatus for a first autonomous vehicle to instruct a second autonomous vehicle to perform at least a part of at least a portion of a task, in response to a bid from at least a second autonomous vehicle. For instance, in one example, a processing system of a first autonomous vehicle including at least one processor may obtain an assignment to perform a task having a plurality of task requirements, calculate at least a probability that the first autonomous vehicle will not be able to achieve at least one of the plurality of task requirements, and transmit an offer to at least one additional autonomous vehicle to perform at least a portion of the task, where the offer includes at least one value element. The processing system may then instruct a second autonomous vehicle from among the at least one additional autonomous vehicle to perform at least a part of the at least the portion of the task, in response to a bid from the second autonomous vehicle to perform the at least the part of the at least the portion of the task. The processing system may further determine that the second autonomous vehicle has completed the at least the part of the at least the portion of the task and exchange the at least one value element with the second autonomous vehicle in response to determining that the second autonomous vehicle has completed the at least the part of the at least the portion of the task.

BRIEF DESCRIPTION OF THE DRAWINGS

The teaching of the present disclosure can be readily understood by considering the following detailed description in conjunction with the accompanying drawings, in which:

FIG. 2 illustrates examples of a fleet database and a task database, in accordance with the present disclosure;

FIG. 3 illustrates a flowchart of an example method for assigning a task to a first autonomous vehicle and at least a second autonomous vehicle in response to a bid from the first autonomous vehicle;

To facilitate understanding, identical reference numerals have been used, where possible, to designate identical elements that are common to the figures.

DETAILED DESCRIPTION

Figure 1:
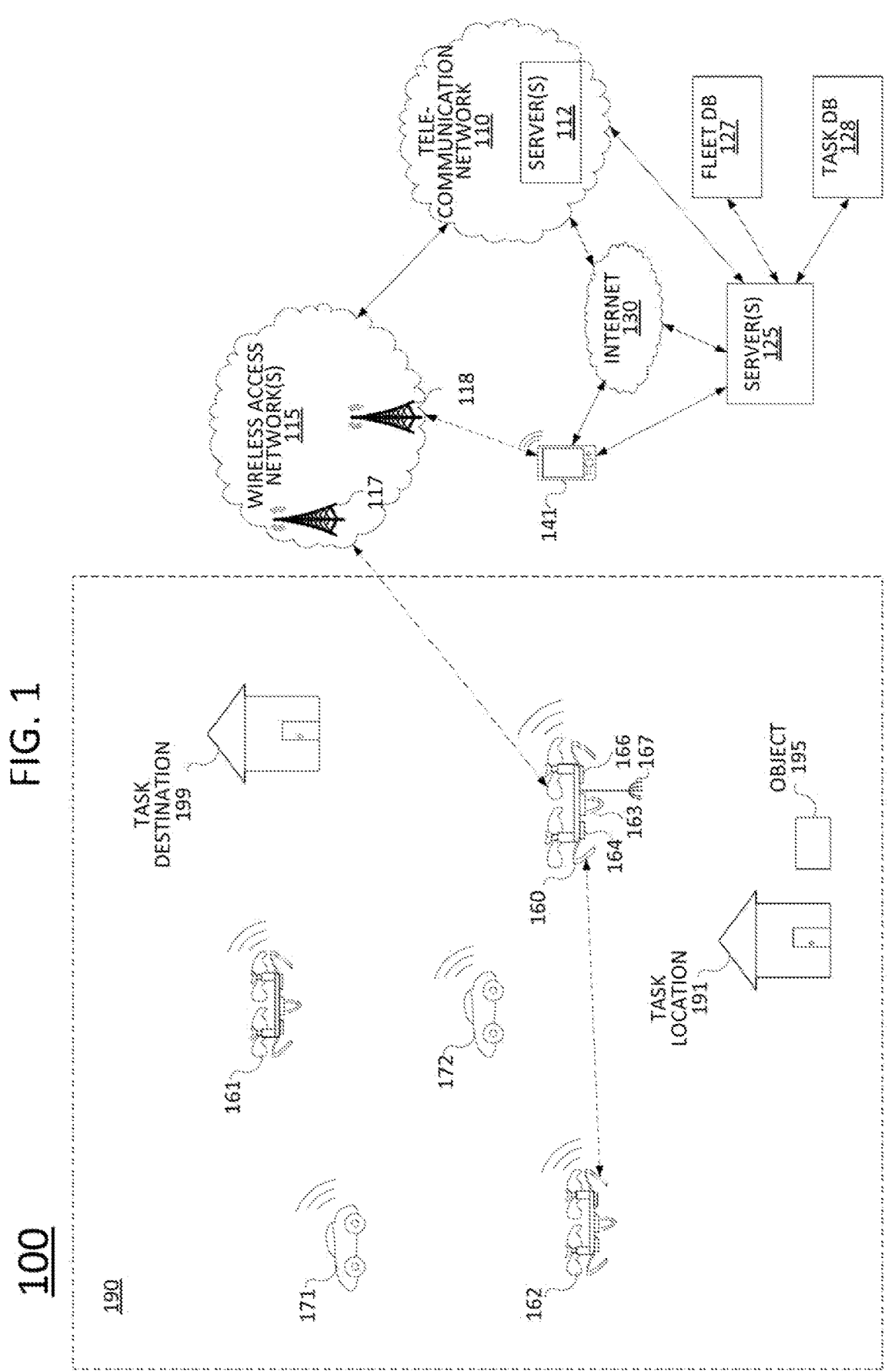
FIG. 1 illustrates an example system related to the present disclosure.

Examples of the present disclosure describe methods, computer-readable media, and apparatuses for assigning a task to a first autonomous vehicle and at least a second autonomous vehicle in response to a bid from the first autonomous vehicle, and methods, computer-readable media, and apparatuses for a first autonomous vehicle to instruct a second autonomous vehicle to perform at least a part of at least a portion of a task, in response to a bid from at least the second autonomous vehicle. In particular, examples of the present disclosure provide an autonomous vehicle fleet management system that enables autonomous vehicles (AVs) to compete and/or collaborate for the right to perform a task, such as delivering a package, performing mapping, imaging, or sensor reading within an area or over a path, providing a temporary lighting service, etc. In one example, AVs make decisions regarding competition or collaboration on a task autonomously based on their capabilities and other criteria. In particular, an AV may independently engage help from another AV to acquire the necessary skills, resources and/or capabilities to perform or to compete for a task. Tasks may be submitted to the fleet management system by users or by other automated systems having AV tasks for fulfillment.

In one example, a user may submit a task to be performed to a fleet management system. In accordance with the present disclosure, the task may be of a nature that some or all requirements of the task can be performed by an AV. For example, the task may be a delivery of a payload, capturing a video or image, taking sensor readings, collecting data, taking inventory, providing lighting for an area, etc. In one example, each task may have a task site where the task is to begin. All requirements of the task may be performed at the task site, or the task may involve the AV traveling from a start task site to a destination task site. In one example, each new task is recorded in a task database of the fleet management system, including a set of data that describes the requirements of the task. These requirements may be based on the nature of the task. In one example, the requirements may be defined by the user submitting the request. Alternatively, or in addition, at least a portion of the requirements may be determined by the fleet management system, or "command center."

For instance, in one example, a task may be to deliver a payload, such as the return of an item from a home to a distribution center. In another example, a task may be to capture video at a task site. For instance, a user may wish to acquire video surveillance of an exterior of a home, an office building, etc. In another example, the task may be to capture video from a start task site to a destination task site. For example, the user may wish to employ one or more AVs to video record a package delivery by another AV. In each example, the task and task requirements may be stored in the task database. The task requirements may include such things as a speed requirement, a lightning requirement, a minimum payload requirement, a security clearance level, one or more navigational features (e.g., collision avoidance capability, defensive maneuvering capability, etc.), a noise level requirement, a camera requirement, a sound recording requirement, a light detection and ranging requirement, other sensor requirements (e.g., a temperature sensor requirement, a sonar requirement, and so on), a lighting requirement, a range requirement, a projector requirement, a loudspeaker requirement, and so on. The task requirements may also include a location of the task to be performed and a required arrive-by date and time and/or an estimated time of arrival, and in some cases, a destination location.

In one example, a fleet of AVs may all be registered in a fleet database of the fleet management system. In one example, the fleet management system is to manage a defined geographical area in which the fleet is to operate. For instance, the geographical area, or operational zone, may be defined as a set of geographical coordinates or a range of geographical coordinates. In one example, the fleet database may include, for each AV, an identifier of the AV, a maximum operational range of the AV, a current operational range of the AV, capabilities or features of the AV, such as maneuvering capabilities, safety capabilities, payload/lift capabilities (e.g., including maximum weight, volume, etc.), sensor and recording capabilities, lighting capabilities, visual projection capabilities, sound broadcast capabilities, and so forth. In one example, an AV may also be registered as to whether or not it is currently available for and/or capable of a collaborative mode, e.g., whether it is currently available and/or capable of partnering with another AV to accomplish a task. The registration may be accomplished by the AV itself over a network when an AV becomes active and is within communication range of network access point(s), or may be accomplished by an AV owner or operator at another time.

Members (e.g., AVs) of the fleet may be all known and trusted to the fleet management system and stored in the fleet database. In one example, AVs of the fleet may be owned and/or operated by a same entity or organization as the fleet management system. Alternatively, or in addition, AVs may be independently owned and operated, but may be registered by the fleet management system, entered into the fleet database, and may then be eligible to obtain task assignments from the fleet management system. For instance, in one example, an unknown AV may attempt to register in the fleet database in an ad hoc manner. For example, the unknown AV may be able to perform a task while it is within or near the operational zone of the fleet management system. The fleet management system may broadcast its willingness to accept unknown AVs on an ad hoc basis. In doing so, the fleet management system may include minimum requirements that must be met for an AV to attempt to register. An unknown AV may send a registration attempt to the fleet management system and it may be accepted or not accepted based on an analysis of the capabilities that the unknown AV asserts. In one example, an unknown AV may be added to the fleet on a provisional basis, for fulfilling only tasks with certain requirements, or may be permanently added to the fleet. In one example, an unknown AV's registration request may include a "reference" from a known AV (e.g., a current member of the fleet), based on performance of a collaborative task with the known AV on a prior occasion. For instance, the known AV and the unknown AV may have performed a prior collaborative task (e.g., in connection with a different fleet and/or fleet management system).

In one example, the fleet management system may accept a new task, enter the new task into the task database, and broadcast an offer to AVs in the fleet (e.g., AVs registered in the fleet database) to perform the new task. In one example, the fleet management system may determine requirements for the task, which may be defined in the request for the task, or which may be calculated based upon parameters of the request for the task. For instance, if a task location and a destination are defined, the fleet management system may determine a minimum distance/range requirement, such as the straight line distance between a start task location and the destination task location or via a permissive set of previously defined AV corridors between the start task location and the destination task location. Likewise, if a task location is known to be in a crowded area that is known to the fleet management system, the fleet management may automatically determine that advanced maneuvering, collision avoidance, or similar capabilities is/are required for the task. In one example, the fleet management system may send the broadcast to only those AVs in the fleet with capabilities matching the requirements of the task. In one example, the capabilities may include a current distance to the task location, e.g., AVs known to be too far away may not receive the offer because the fleet management system may preemptively determine that any acceptance of the offer by such an AV would be non-compliant with the requirements and would be rejected. In one example, the offer is broadcast or otherwise transmitted to AVs that are within network communication range. In other words, AVs that are currently "offline" may not receive the offer, even if such AVs may be available at the later time that the task is to be performed, even if the AVs are within an acceptable geographic range and meet other requirements, etc. Additionally, in one example, incentive data may be included in the broadcast that defines a value to be exchanged for the AV(s) performing the task.

In one example, the fleet management system may send the offer to all or a portion of the fleet (e.g., registered AVs) and allow AVs to collaborate to decide whether or not to make themselves available to collectively perform the task. Thus, one or more AVs receiving the offer may elect to partner with one or more other AVs receiving the offer (or AVs that have not received the offer, but which may be available for collaborative task performance) to become candidates for performing the task. For example, each AV may autonomously decide whether to make itself a candidate for the task, and autonomously decide and negotiate whether to partner with one or more other AVs without the involvement of the fleet management system. Factors in the decision may include available battery charge, safety level of the task site, weather conditions en route to the task site, other available offered tasks, and other factors. For example, when the task is the delivery of a payload from a start task site to a destination task site, a first AV, e.g., AV1, may have an operational range that includes the start task site, but not the destination task site. AV1 may communicate with a second AV, e.g., AV2, if both are open to collaboration. AV1 may negotiate an agreement with AV2 for AV1 to pick up the payload at the start task site and drop off the payload with AV2 at an intermediate task site, which will then complete the task by delivering it to the destination task site. In another example, AV1 may have all the capabilities to fulfill the requirements of the task, except an infrared camera. However, another AV, e.g., AV3 may have a camera but may lack a payload or lift capacity required for the task. That is, neither AV1 nor AV3 alone could fulfill the task by itself, but together would be able to complete the task and meet all the requirements. Thus, in one example, AV1 and AV3 may negotiate a joint offer to fulfill the task.

In some cases, an AV may be lacking knowledge/data or a skill in order to fulfill a task, and therefore could not make an offer to complete the task alone. For instance, AV1 may lack knowledge of the safety level of the task site, which AV3 may have. In another example, AV1 may lack a software-based maneuvering skill, which still another AV, AV4, may have. In these cases, AV1 may first acquire the data or skill from another AV and then be able to make its own offer to fulfill the task. The negotiation may include whether AV1 may use the skill only for the present task, or may retain the skill for future tasks. In another example, the AVs may perform the task together via which AV1 may acquire the requisite knowledge to perform similar aspects of future tasks. For instance, AV1 may carry a payload and follow AV4 into an area for which AV1 lacks a map. AV1 may make a map of the area as it passes through. Then AV1 may be equipped in future instances to carry a payload through the same area without assistance from another AV.

In one example, an AV receiving the offer may determine that it cannot complete the task alone by considering task requirements that may be included in the offer against the current capabilities of the AV. Such an AV that cannot complete the task alone may seek other AVs within the fleet (that may or may not have also received the offer) to collaborate and submit a bid to complete the task. Alternatively, or in addition, the AV determining that it cannot complete the task alone may seek other AVs that may not be part of the fleet, but that may be within the vicinity and that may be available for collaboration. For instance, in one example, the AV may broadcast an offer to collaborate on the task, and may include in the offer one or more task requirements that it cannot fulfill, and for which the AV seeks one or more other AVs to provide capabilities matching such requirements. In another example, AVs in a fleet may have share capability information or may have access to capability information of other AVs in the fleet via the fleet management system and the fleet database. As such, an AV receiving an offer from the fleet management system that detects it cannot perform a task alone may identify one or more other specific AVs in the fleet that appear to be able to fulfill the missing requirements, and may present offers for collaboration specifically to these one or more AVs of the fleet. Alternatively, or in addition, an independent AV (e.g., an AV that is not already part of the fleet) may broadcast its availability as the AV operates within an area. Thus, other nearby AVs may detect these broadcasts and have awareness that the independent AV is available, what its capabilities are, etc. Accordingly, in one example, an AV receiving an offer from the fleet management system that detects its inability to perform a task alone may identify one or more independent AVs nearby that may have capabilities matching the unfulfilled requirements, and may present offers for collaboration specifically to these one or more nearby, independent AVs.

Notably, another AV from the fleet may determine that it alone may perform the task. Thus, such an AV may reject an offer for collaboration. However, an independent AV that receives an offer for collaboration and that determines that it alone could perform the task, may nevertheless still need to partner with the AV offering to collaborate. In particular, since the independent AV is not known to the fleet management system, the independent AV may not be permitted to submit its own bid to complete the task.

In any case, when a first AV offering to collaborate secures an agreement from one or more additional AVs, the first AV may transmit a bid to compete for obtaining the task assignment to the fleet management system. The bid may be obtained by the fleet management system over one or more networks and may include an identification of the first AV, identifications of one or more additional AVs collaborating on the task, a value amount (which may be the same or different from a value amount included by the fleet management system in the original offer broadcast to the fleet), for collaborating AVs that are unknown to the fleet management system, reputation information (such as identities of other AVs in the fleet that may provide positive feedback regarding prior collaborative tasks with the unknown AV), and so on.

Notably, one or more bids to perform the task may be received. In addition, the offers may be competitive, in which case the fleet management system may make a decision based on conditions submitted with the bids (e.g., respective value amounts, the AVs collaborating on a bid (for collaborative/joint bids), the reputation score(s) of the AV(s) e.g., from prior completed tasks performed by the AV(s), the capabilities of the AV(s), and so forth. For instance, bids indicating lower value amounts may be preferentially selected, bids from AVs with the highest trust/reputation scores may be preferentially selected, etc. Similarly, bids from AV(s) with better capabilities may be preferentially selected. For example, a bid may be favorably weighted when an AV, or AVs collaborating for the bid/task, may have capabilities that exceed requirements (e.g., when a payload capacity of 100 kilograms is needed for the task and a bid includes an AV with a 200 kilogram lift capacity, this excess capacity may be considered a favorable advantage, such as providing a large margin of error). Accordingly, in one example, multiple factors or conditions relating to a bid may be weighted to provide a score or probability of selection of a bid. In one example, round robin or fairness scheduling algorithms may also be applied to weight bids so that tasks tend to be more evenly assigned over the AVs in the fleet.

When a decision is made among competing bids, the fleet management system may assign the task by marking the task entry in the task database as "assigned" and noting the AV(s) assigned the task, the value agreed upon, etc., and may notify the AVs accordingly. In addition, the AV(s) assigned to the task may be marked as "on task" in the fleet database. For instance, other new tasks that may be in conflict with the current assigned task may not be presented to AVs that are "on task" at a same or overlapping time.

Following the completion of a task, a record of the successful completion may be made in the task database and/or the fleet database. In the fleet database, the record may include characteristics of the task, so that the fleet management system may know, over time, what types of tasks each member of the fleet can perform successfully. In the case of a collaborative task, the record may include data on which parts of the task were performed by which AV. Similarly, an AV may maintain its own history of completed tasks. This history may also include data about collaborative tasks with other AVs. For example, AV1 may perform a collaborative task (outside of the known fleet) with AV3. If AV3 is unknown to the fleet management system, then if unknown AV3 attempts to register with the fleet (as discussed above), then it may use AV1 as a "reference" in doing so.

In one example, an AV may negotiate an agreement to collaborate to perform a task (or to at least submit a bid to perform such a task) with a non-autonomous vehicle (NAV) or semi-autonomous vehicle. For instance, a vehicle may be navigated between a vehicle owner's home and a work destination. There may be a route loaded into a global positioning system (GPS) navigation unit of the vehicle that may be broadcast with an indication that the (NAV) is available for task collaboration with AVs, the capabilities of the NAV (such as a carrying capacity, a time of availability, the route the NAV is travelling, a value element or elements desired for different types of tasks or portions of tasks, etc.). Thus, for example, an AV may determine that it cannot perform an offered task of a package delivery alone, but may detect that the NAV is travelling in a useful direction such that the AV may seek to deliver the package to the NAV, and obtain an agreement from an additional AV to retrieve the package from the NAV near the NAV's destination of the owner's work location, and to deliver the package to the final destination of the package according to the task request. In one example, a computing system of the NAV may activate a collaboration mode, in which an availability for collaboration and the desired terms thereof are broadcast, in response to a user input. The NAV may therefore handle the negotiation of the collaboration terms in a similar manner to an AV, but under the ultimate control of the user. In another example, a NAV may provide an interface to enable the user to make a final decision to collaborate or not, or may provide an option for a user to negotiate terms of the collaboration (e.g., to indicate a different value element from what is offered, etc.).

As stated above, in some examples, AVs may collaborate to perform a task. In such cases, the AVs may further engage in transactions to exchange value elements with each other in connection with the performance of such joint/collaborative task. To illustrate, AV1 may have been assigned a task to complete, e.g., by a fleet management system. In some cases, AV1 may need assistance from another AV to complete the task. For example, AV1 may not have all the capabilities required for the task. Accordingly, AV1 may beckon AV2, for instance, to handle delivery on the last leg of a route inside a building (where AV1 cannot travel, e.g., due to size restriction, authorization for entry, and so on). However, in another example, AV1 may be performing a task, such as taking a video, and may experience mechanical problems, or otherwise become disabled. In such case, AV1 may beckon AV3 to take over the completion of the task. In still another example, AV1 may be collecting sensor data from a number of areas at a location and may need assistance to cover the area more quickly, e.g., due to time constraints, rapidly changing weather conditions, etc.

There may be other circumstances under which AV1 may have an encounter with AV2 or AV3 in such a way that AV2 and AV3 are known to AV1 and have an established level of trust. For example, all three AVs may be registered with the same fleet or have the same owner when they are operating within proximity of one another. In other cases, there may not be a pre-established relationship between, say AV1 and AV3. It may also be the case that the two AVs are not currently collaborating on a task. They may simply be operating within proximity of one another. In this case, one or both of the AVs may broadcast data that describes their capabilities, skills, and data that may have value to other AVs. A decision to engage may be based on an AV's needs and what other AVs in the area are offering. For example, AV3 may broadcast its value element offerings, such as flight data, video and other content, human encounter data, morning car traffic data, or any other types of data. AV1 may choose to engage with AV3 based on the fact that AV3's prior flight path included a planned route for AV1 and AV1 may wish to acquire data describing conditions, such as weather conditions or safety conditions along the path so that AV1 may make navigational decisions based on this data as it traverses the path.

Over time, AVs may build up sets of data that describe tasks that they have performed, places they have been, other AVs (which "vouch for them" as references) that they have exchanged data with or collaborated with on a task, and other data that represents a "resume" for the AV. The AV's performance may also be rated over time by other AVs collaborating on a task or by other AV owners.

Whether the AV-to-AV encounter is pre-arranged (e.g., in order to bid on a task offered by a fleet management system) or incidental (e.g., while AV1 is in the middle of performing a task and may encounter mechanical difficulties, a change in weather, or other changes in circumstances), AV1 may choose to engage with AV2 or AV3. The engagement with AV2 may be as a result of AV1 and AV2 collaborating on a task or otherwise being known and trusted. The engagement with AV3 may be in response to AV3's broadcast value offerings. In the case of AV2, for instance, which provided assistance to AV1 to perform a task, AV1 may "owe" AV2 an exchange of value from AV1 to AV2. The amount and type of value sent from AV1 to AV2 in a transaction may be either negotiated between the two AVs either before or after completion of the task. It may also be dependent on how well AV2 performed on the completion of the task. AV2 may earn a bonus if it arrived at the task site early or completed an extra amount of sensor data collection than expected, for instance.

Value elements may include, among others: digital currency, power, such as battery charge, flight route data, environmental data, security and safety data, AV traffic data, relationships with other AVs, which may be useful in having one AV "vouch for" another to facilitate establishing trust between two AVs, task assignment data, human encounter data, such as data identifying people who interact well or knowledgeably with AVs, or those who do not interact well with AVs, opportunities for future task collaborations (and additional value elements associated therewith), and so on.

If the value element is software that defines a skill for the AV, it may be sent from AV1 to AV2 as data. In addition, a license to use the software may be exchanged and optionally recorded in the fleet database as well, e.g., the license may allow a certain number of AVs to operate at any given time. AV2 may be authorized to accept the conditions of the license by using artificial intelligence (AI) techniques to ensure that the license agreement language is acceptable to its owner. In this manner one AV may provide licensed software to another without human intervention.

Thus, the present examples describe a fleet management system that is able to assign tasks to AVs, approve collaboration among AVs to perform tasks, add new AVs to a fleet database, and so on. The present examples also describe AV-to-AV communications to establish collaborations on tasks and to exchange value element(s) in connection therewith. It should be noted that for illustrative purposes the present disclosure is described primarily in connection with examples of autonomous aerial vehicles (AAV). However, each of the described examples may be equally applicable to other types of AVs, such as autonomous submersibles, autonomous land surface travelling vehicles, autonomous water surface travelling vehicles (e.g., boats, hydrofoils, hovercraft, etc.). These and other aspects of the present disclosure are discussed in greater detail below in connection with the examples of FIGS. 1-5.

To aid in understanding the present disclosure, FIG. 1 illustrates an example system 100, related to the present disclosure. As shown in FIG. 1, the system 100 connects user device 141, server(s) 112, server(s) 125, autonomous aerial vehicles (AAVs 160-162), and autonomous vehicles (AVs) 171 and 172 with one another and with various other devices via a core network, e.g., a telecommunication network 110, a wireless access network 115 (e.g., a cellular network), and Internet 130.

Figure 5:
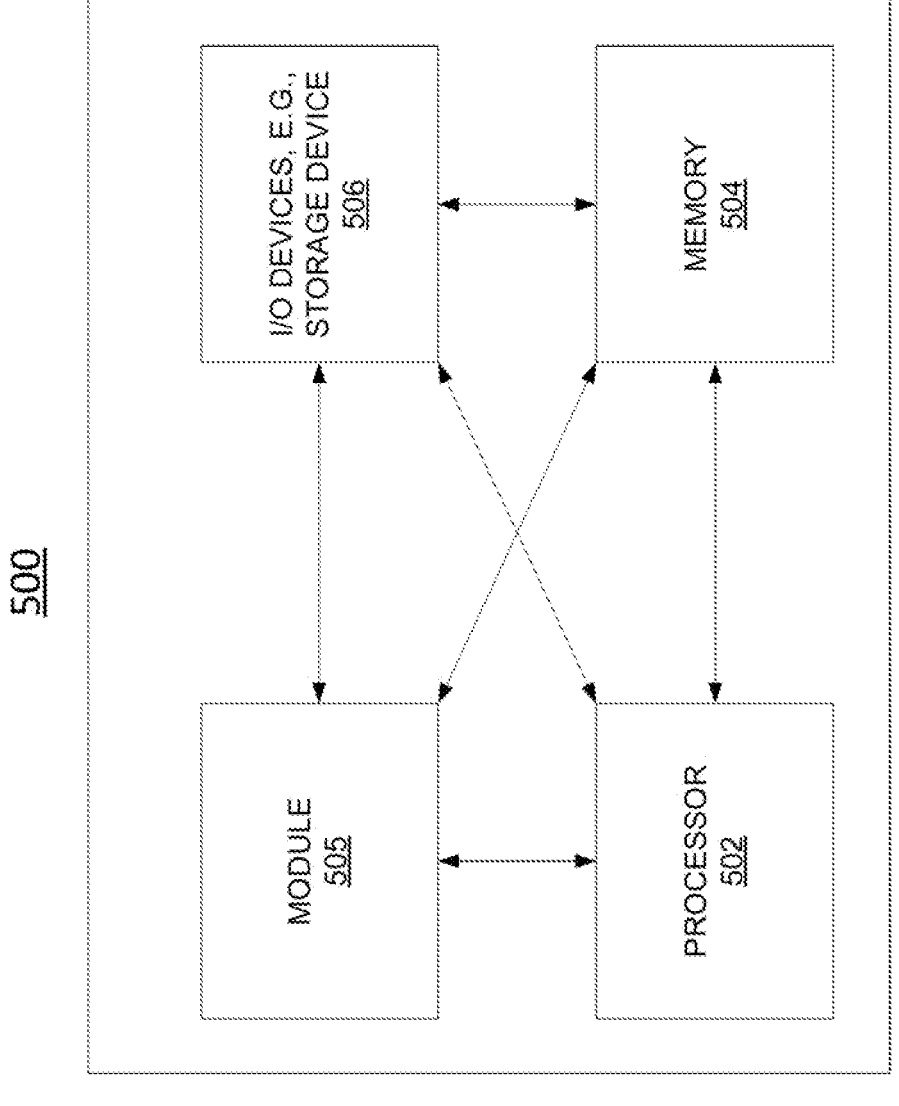
FIG. 5 illustrates an example high-level block diagram of a computing device specifically programmed to perform the steps, functions, blocks, and/or operations described herein.

In one example, the server(s) 125 may each comprise a computing device or processing system, such as computing system 500 depicted in FIG. 5, and may be configured to perform one or more steps, functions, or operations for assigning a task to a first autonomous vehicle and at least a second autonomous vehicle in response to a bid from the first autonomous vehicle. For instance, an example method for assigning a task to a first autonomous vehicle and at least a second autonomous vehicle in response to a bid from the first autonomous vehicle is illustrated in FIG. 3 and described below. In addition, it should be noted that as used herein, the terms "configure," and "reconfigure" may refer to programming or loading a processing system with computer-readable/computer-executable instructions, code, and/ or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, server(s) 125 may comprise, or be coupled to or in communication with a fleet database 127 and a task database 128. For instance, the server(s) 112, or server(s) 125 in conjunction with fleet database 127 and a task database 128 may comprise a fleet management system in accordance with the present disclosure. In one example, fleet database 127 and task database 128 may represent a distributed file system, e.g., a Hadoop® Distributed File System (HDFS™), or the like. Server(s) 125 may receive and store information regarding AVs in fleet database 127, such as, for each AV: an identifier of the AV, a maximum operational range of the AV, a current operational range of the AV, capabilities or features of the AV, such as maneuvering capabilities, payload/lift capabilities (e.g., including maximum weight, volume, etc.), sensor and recording capabilities, lighting capabilities, visual projection capabilities, sound broadcast capabilities, and so forth. In one example, an AV may also be registered as to whether or not it is currently available for and/or capable of a collaborative mode, e.g., whether it is currently available and/or capable of partnering with another AV to accomplish a task. The registration may be accomplished by the AV itself over a network when an AV becomes active and is communication range of network access point(s) (e.g., base stations 117 and/or 118), or may be accomplished by an AV owner or operator at another time. In the present example, for illustrative purposes, AAV 160, AAV 161, and AV 171 may be registered in the fleet database 127 (and are thus members of a fleet that is associated with the fleet management system of server(s) 125), while AAV 162 and AV 172 may be independent AVs that are not currently part of the fleet. Server(s) 125 may include new AVs in the fleet on a permanent, temporary, or provisional basis (such as AAV 162 and/or AV 172) as described in greater detail below. The fleet database 127 may also store information regarding assignments of AVs in the fleet to various tasks, reputation/ trust level information regarding various AVs, and so on.

Server(s) 125 may also receive task requests, and generate and store task information/task records in task database 128. Each task record may identify a task requester (such as a user of user device 141 submitting a first task request to server(s) 125), a time of the request, etc. and may include a set of data that describes the requirements of the task. These requirements may be based on the nature of the task. In one example, the requirements may be defined by the user submitting the request. Alternatively, or in addition, at least a portion of the requirements may be determined by the server(s) 125. The task requirements may include such requirements as a speed requirement, a lightning requirement, a minimum payload requirement, a security clearance level, one or more navigational features (e.g., collision avoidance capability, defensive maneuvering capability, etc.), a noise level requirement, a camera requirement, a sound recording requirement, a light detection and ranging requirement, other sensor requirements (e.g., a temperature sensor requirement, a sonar requirement, and so on), a lighting requirement, a range requirement, a projector requirement, a loudspeaker requirement, and so on. The task requirements may also include a location of the task and a required arrive-by date and time and/or an estimated time of arrival, and in some cases, a destination. Task records may also include information regarding assignments of tasks to one or more AVs, the successfully completion of such tasks, or any irregularities regarding the completion (or non-completion of such tasks), and so on.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include one or more servers 112. In one example, each of the server(s) 112 may comprise a computing device or processing system, such as computing system 500 depicted in FIG. 5 and may be configured to provide one or more functions for assigning a task to a first autonomous vehicle and at least a second autonomous vehicle in response to a bid from the first autonomous vehicle, in accordance with the present disclosure. For example, one or more of the server(s) 112 may be configured to perform one or more steps, functions, or operations in connection with the example method 300 described below. In one example, server(s) 112 may perform the same or similar functions as server(s) 125. For instance, telecommunication network 110 may provide a fleet management system, e.g., as a service to one or more subscribers/customers, in addition to telephony services, data communication services, television services, etc. For ease of illustration, various additional elements of telecommunication network 110 are omitted from FIG. 1.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user device 141, AAVs 160-162, and AVs 171-172 may be in communication with base stations 117 and 118, which provide connectivity between AAVs 160-162, AVs 171-172, user device 141, and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

As illustrated in FIG. 1, user device 141 may comprise, for example, a cellular telephone, a smartphone, a tablet computing device, a laptop computer, a desktop computer, a wireless enabled wristwatch, or any other wireless and/or cellular-capable mobile telephony and computing devices (broadly, a "mobile device" or "mobile endpoint device"). In one example, user device 141 may instead comprise a cloud desktop, or the like, wherein the "user device" may comprise network-based computing resources that are allocated to a user and which may provide for an operating system and a suite of applications which may provide similar functions to a desktop computer, a laptop computer, a mobile computing device, etc.

In one example, user device 141 may be equipped for cellular and non-cellular wireless communication. For instance, user device 141 may include components which support peer-to-peer and/or short range wireless communications. Thus, user device 141 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In accordance with the present disclosure, AAV 160 may include a camera 163 and one or more radio frequency (RF) transceivers 166 for cellular communications and/or for non-cellular wireless communications. In one example, AAV 160 may also include one or more module(s) 164 with one or more additional controllable components, such as a microphone, a loudspeaker, an infrared, ultraviolet, or visible spectrum light source, a projector, a light detection and ranging (LiDAR) unit, a temperature sensor (e.g., a thermometer), and so forth. In addition, AAV 160 may include a cargo handling element 167. As illustrated, cargo handling element 167 may comprise a lift hook or clamp for engaging a cargo carrier, e.g., a basket and the like. However, in another example, cargo handling element 167 may alternatively or additionally comprise an internal cargo compartment in which to receive and transport an item or object. It should be noted that AAVs 161 and 162 may be similarly equipped. However, for ease of illustration, specific labels for such components of AAV 161 and AAV 162 are omitted from FIG. 1. In addition, AVs 171 and 172 may similarly be equipped with transceivers for cellular or non-cellular wireless communication, various modules with sensors or other controllable components, a cargo handling element, etc.

Figure 4:
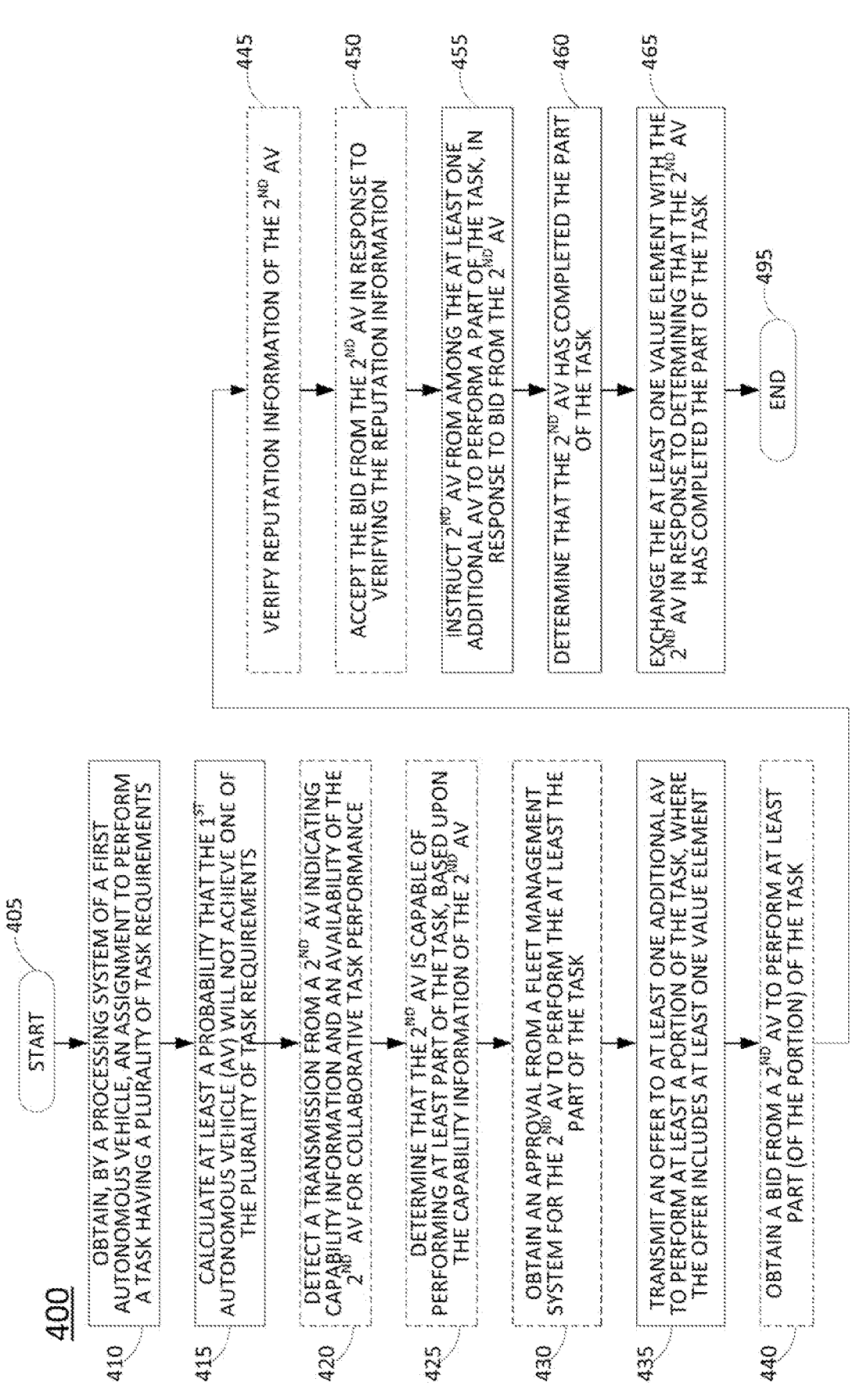
FIG. 4 illustrates a flowchart of an example method for a first autonomous vehicle to instruct a second autonomous vehicle to perform at least a part of at least a portion of a task, in response to a bid from at least a second autonomous vehicle.

In addition, each of the AAVs 160-162 and AVs 171-172 may include on-board processing systems to perform steps, functions, and/or operations for a first autonomous vehicle to instruct a second autonomous vehicle to perform at least a part of at least a portion of a task, in response to a bid from at least a second autonomous vehicle, as well as steps, functions, and/or operations in connection with examples of the present disclosure for assigning a task to a first autonomous vehicle and at least a second autonomous vehicle in response to a bid from the first autonomous vehicle, and for controlling various components of the respective AVs. For instance, AAVs 160-162, and/or AVs 171-172 may each comprise all or a portion of a computing device or processing system, such as computing system 500 as described in connection with FIG. 5 below, specifically configured to perform various steps, functions, and/or operations for a first autonomous vehicle to instruct a second autonomous vehicle to perform at least a part of at least a portion of a task, in response to a bid from at least a second autonomous vehicle. For instance, an example method 400 for a first autonomous vehicle to instruct a second autonomous vehicle to perform at least a part of at least a portion of a task, in response to a bid from at least a second autonomous vehicle is illustrated in FIG. 4 and described in greater detail below. In addition, each of AAVs 160-162 and AVs 171-172 may also perform various steps, functions, and/or operations in connection with examples of the present disclosure for assigning a task to a first autonomous vehicle and at least a second autonomous vehicle in response to a bid from the first autonomous vehicle, such as described in connection with the example method 300 of FIG. 3.

In an illustrative example, a user, via user device 141, may transmit a task request for a new task to server(s) 125. The user may be a staff member/personnel of an owner or operator of a fleet management system comprising server(s) 125, or may be an authorized user, such as a registered customer permitted to submit task requests to the fleet management system. In the present example, the task request may be for delivering an object 195 from a task location 191 (e.g., a start location for the task) to a task destination 199 (e.g., an end location where the task is completed). The task request may include a weight of the object 195, dimensions (e.g., length, width, height) of the object 195, a preferred pickup time and/or a latest delivery time, the task start location 191, the task destination location 195, and so on.

The server(s) 125 may receive the task request and may initially screen the task request for compliance with various restrictions or other criteria, such as ensuring that the requested delivery time is after the requested pickup time, that the item weight and/or dimensions does/do not exceed maximum(s) that can be achieved by AVs in the fleet, that the user is authorized to make such a request (for instance, some users may not be permitted to engage AVs with certain features, such as higher security clearance levels), that the task does not relate to a hazardous or prohibited item, and so on. For a compliant task, the server(s) 125 may enter the task in the task database 128. In one example, server(s) 125 may determine task requirements of the task. For example, some of the task requirements may be included in the task request, as stated above, such as: a lift/load capacity, a pickup time and/or delivery time requirement, a task location, a task destination, etc. In addition, in one example, server(s) 125 may determine one or more task requirements from addition criteria. For instance, if the task destination is in a known high density area, the server(s) 125 may add a requirement that any bids to perform the task include an AV with advanced collision avoidance capability. Similarly, if the task location (e.g., the pickup location) is part of or near a known secure facility, the server(s) 125 may add a requirement for a certain security/trust level, e.g., to avoid any delay that may result from another AV without the proper level of security/trust being delayed or diverted by authorities. Additional requirements may be added by server(s) 125 relating to terrain along an anticipated route between the task location and task destination, anticipated weather conditions along the anticipated route at the time the task is to be performed, or the like.

In this regard, server(s) 125 may access a geographic information system (GIS), e.g., comprising a digital elevation model (DEM), which may comprise a set of raster files or other format files, that records elevations for a set of given points (latitude, longitude). For instance, the digital elevation model may comprise Shuttle Radar Topography Mission (SRTM) data, which may provide measurements of elevation (e.g., relative to mean sea level (MSL)) in 1 arc-second, 30 meter resolution. In one example, the digital elevation model may be maintained by a commercial DEM provider, and so forth. Accordingly, server(s) 125 may access a digital elevation model for region 190. Similarly, server(s) 125 may obtain weather data from a weather data service (WDS). For instance, the WDS may provide weather forecasts relating to one or more types of weather conditions for locations (or positions in three-dimensional space) of region 190. For ease of illustration, an example GIS and WDS is omitted from FIG. 1. However, it should be understood that a GIS and WDS may be maintained on servers that are accessible via the Internet 130, and which may reside in a GIS or WDS organization network, respectively, in a public or private cloud servers, etc.

In one example, the task requirements may be stored in a task record in the task database 128. In this regard, FIG. 2 illustrates an example of a task database 200 comprising a plurality of task records. For instance, the task database 200 may represent task database 128 of FIG. 1. Accordingly, the new task request from user device 141 may comprise "Task 2" in the task database 200 as illustrated in FIG. 2. In one example, the server(s) 125 may then search the fleet database 127 for AVs that are capable of performing the task. FIG. 2 also illustrates an example fleet database 210 comprising a plurality of AV records. For instance, fleet database 210 may represent fleet database 127 of FIG. 1. Accordingly, AV1 of fleet database 210 of FIG. 2 may represent AAV 160 of FIG. 1. Similarly AV2 may represent AAV 161 and AV3 may represent AV 171.

Continuing with the present example, Task 2 may have a payload/lift requirement of 10 pounds and may require collision avoidance capability, which means that AV1 (AAV 160) cannot perform the task alone (due to the payload/lift requirement) and AV2 (AAV 161) is also incapable of handling the task without assistance due the collision avoidance requirement. In one example, server(s) 125 may first transmit offers to perform the task to AVs in the fleet that are capable of performing the task alone. As such, server(s) 125 may transmit the offer to other AVs (not shown, and for ease of illustration, records of which are also omitted from fleet database 210). It should be noted that the offer is also not transmitted to AAV 162, because AAV 162 is not part of the fleet.

In another example, the offer may be transmitted, or broadcast, to all of the fleet (or at least all members of the fleet that are currently available, are within communication range and have an active transceiver, etc.), regardless of whether each of the AVs in the fleet is capable of performing the task alone. Similarly, if an offer is transmitted only to AVs in the fleet that are capable of performing the task alone (at least according to the fleet database 210), but there is no bid in response thereto, the server(s) 125 may then expand the offer to additional members of the fleet or all members of the fleet (e.g., via a subsequent broadcast or other transmissions of the offer). For illustrative purposes, it may be assumed that AAV 160 (AV1 in FIG. 2) has received the offer regarding the task (Task 2 in FIG. 2) from server(s) 125. In one example, AAV 161 may also receive the offer. However, in another example AAV 161 may temporarily be out of communication range or otherwise offline, and may not receive the offer. Upon receiving the task offer, AAV 160 may determine whether it is available to perform the task, whether the value offering of the task is sufficient (e.g., per a configuration of an owner or operator of AAV 160, if different from the operator of the fleet management system of server(s) 125), whether it is capable of performing the task, and in this case, when not able to perform the task alone, if it is able to collaborate with one or more other AVs to perform the task.

In this case, AAV 160 may be available and willing to perform the task, but does not meet the task requirements, e.g., due to the payload being 10 pounds and the capacity of AAV 160 (AV1) being only 7 pounds. As such, AAV 160 may solicit assistance from one or more other AVs to collaborate. In one example, AAV 160 may broadcast an offer to collaborate (e.g., via a wireless broadcast using the AAV's transceiver(s), such as Wi-Fi Direct broadcast, LTE Direct, Dedicated Short Range Communications (DSRC), e.g., in the 5.9 MHz band, or the like, a 5G device-to-device (D2D) or vehicle-to-vehicle (V2V) sidelink, such as over a P5 interface, and so forth). Alternatively, or in addition, other AVs that are willing and able to collaborate may broadcast their availability and capabilities via a same or similar messaging. Accordingly, AAV 160 may detect one or more of these broadcasts, may identify one or more other AVs that meet the task requirements that AAV 160 cannot fulfill itself, and may transmit one or more offers to collaborate specifically to these one or more other AVs. It should be noted that the other AVs to which the offer, or offers to collaborate are directed may comprise other AVs in the fleet database 127 (e.g., fleet database 210 of FIG. 2). As such, these other AVs may already have received an offer regarding the task from server(s) 125.

It should be noted that in accordance with the present disclosure, an AV such as AAV 160 may seek to collaborate with other AVs that are already in the fleet, and which may or may not have received an offer directly from server(s) 125, or may comprise one or more AVs that are not currently part of the fleet, but which may be in the vicinity and which may be open and available for collaboration. In one example, AAV 160 may include a value element in an offer to collaborate that is broadcast or transmitted to one or more other specific AVs. The value element may comprise at least one knowledge element, such as a map, information regarding at least one condition of at least one area or along a path (e.g., weather information, traffic information, etc.), information regarding reputation/trust information of at least another autonomous vehicle, or information regarding at least one human encounter (e.g., was the human encounter positive or negative, threat or no threat, etc.). To illustrate, AAV 160 may have 3D map of an environment, e.g., to enable enhanced maneuvering in an urban environment, in rough natural terrain, etc. A 2nd AV considering responding to the offer to collaborate may not have this information, and may determine that it would be useful to acquire this knowledge in exchange for performing at least a part of the portion of the task for which AAV 160 is seeking assistance. For example, the 2nd AV may then be able to itself bid on and perform solo tasks in the future that involve operating in that particular space that the 2nd AV previously has no prior experience.

In one example, the at least one value element may comprise a software component, such as a flight control software, a sensor software, an imaging software, or the like. In one example, the at least one value element may comprise a stored electrical charge (e.g., the offer may include an offer to donate additional battery charge in exchange for assistance with the task). In still another example, the at least one value element may comprise an increase of a reputation score or a security level. For instance, AAV 160 may have a high reputation score, trust level, and/or security clearance such that AAV 160 may be permitted to offer to increase other AVs reputation scores, trust levels, and/or security clearance levels as a reward for successful task performance. Alternatively, or in addition, AAV 160 and other AVs may possess respective digital wallets, where the at least one value element may comprise a value amount (e.g., dollar amount) to be exchanged via the respective digital wallets. In one example, AAV 160 may also offer a bonus for early completion or other factors. In addition, in one example, AAV 160 may offer a value element that is dependent upon a value element being offered by the server(s) 125 for completion of the entire task.

To further illustrate, in one example, AAV 162 may obtain the offer to collaborate from AAV 160. AAV 162 may determine that the value element(s) offered is/are acceptable, and may determine that it is capable of performing at least a part of at least a portion of the task for which AAV 160 is seeking assistance. For example, Task 2 has a lift requirement of 10 pounds, which AAV 160 cannot handle. However, AAV 162 may have a lift capacity of 20 pounds, which is more than adequate for the task. For illustrative purposes, it may be assumed that AAV 162 may be capable of performing all of the portion of the task for which AAV 160 is seeking assistance. However, it should be noted that in other examples, AAV 162 may bid to perform just a part of the portion of the task for which AAV 160 is seeking assistance (e.g., where one or more other AVs may perform other parts of the portion of the task).

AAV 162 may submit a bid to AAV 160 indicating a willingness to complete the portion of the task (or at least a part thereof). The bid may include capabilities of AAV 162 (if not obtained by AAV 160 prior to broadcasting or otherwise transmitting the request), may include reputation/trust information of AAV 162, may include a value element offering (e.g., AAV 162 may present a "counteroffer" requesting more value or different value element(s) than proposed by AAV 160, etc. AAV 160 may agree to the bid of AAV 162 and transmit a reply indicating the acceptance. AAV 160 may include specific instructions for performing the portion of the task (or at least a part thereof) to AAV 162. In one example, AAV 160 may obtain multiple bids to perform the portion of the task (or at least a part thereof). AAV 160 may then select from among the multiple bids, such as accepting a bid from an AV that is willing to collaborate for the least exchange of value from AAV 160, accepting a bid from an AV that is the most capable of performing the portion of the task (such as an AV with the most excess lift/payload capacity, an AV with the greatest current range, etc.).

In one example, AAV 160 may obtain an approval from a fleet management system of server(s) 125 for AAV 162 to perform at least a part of the portion of the task. Alternatively, or in addition, AAV 160 may verify the reputation information of AAV 162 via communication with one or more other reference AVs that are advertised by AAV 162 as being able to vouch for AAV 162 and may accept the bid from AAV 162 in response to verifying the reputation information. In one example, AAV 160 may identify AAV 162 to the fleet management system of server(s) 125, which may confirm the reputation/trust information of AAV 162 (e.g., by confirming with one or more other AVs of the fleet that AAV 162 indicated as having collaborated with in the past, such as in connection with tasks from a different fleet management system). When the server(s) 125 determine that the reputation/trust information of AAV 162 is acceptable, in one example, AAV 162 may be added to the fleet database 127. In addition, the entry in the task database 128 for the task may be updated to include a reference to AAV 162 performing at least a portion of the task. AAV 162 may be added to the fleet database 127 on a temporary basis, a trial or probationary basis, or a permanent basis. In one example, AVs that are new to the fleet, such as AAV 162 may be restricted from performing certain tasks, e.g., until server(s) 125 have additional experience with AAV 162 and may then increase the reputation/trust information of AAV 162 to a higher level.

Assuming AAV 162 is found to be acceptable for the present task, server(s) 125 may communicate to AAV 160 that AAV 162 is accepted and that AAV 160 may proceed with the collaboration on the task. As such, AAV 160 may agree to the bid of AAV 162 and transmit a reply indicating the acceptance. AAV 160 may include specific instructions for performing the portion of the task (or at least a part thereof) to AAV 162. For instance, Task 2 may require a pickup of object 195 at task location 191 and a delivery to task destination 199. It should be noted that in the present example, AAV 160 may still be necessary to the task based upon one or more additional task requirements. For example, AAV 162 may lack a map to navigate to the task destination 199 that AAV 160 possesses. In another example, the task may require video documentation of the entire delivery. AAV 160 may have a camera to provide such recording, whereas AAV 162 may lack such a camera, and so forth. Notably, upon successful completion of the task (e.g., delivery of object 195 from task location 191, to task destination 199), AAV 160 may exchange the value element with AAV 162, such as providing digital currency to a digital wallet of AAV 162, providing a knowledge item, providing a software item, etc. In each case, the transaction may be a wireless peer-to-peer communication such as described above, or may be achieved via one or more networks, such as via wireless access networks 115, telecommunication network 110, etc.

In one example, task completion may also be notified by AAV 160 to server(s) 125. Server(s) 125 may mark the task "completed" in the task database 128 and may attribute any value elements owed to AAV 160 (which may be further shared with AAV 162, depending upon the arrangement of the collaboration between AAV 160 and AAV 162). In one example, a successful completion of the task may increase a reputation/trust score of AAV 160 and AAV 162. In one example, AAV 162 may be provisionally accepted into the fleet database 127 and may remain in the fleet database 127 but limited to collaborative tasks until it achieves a reputation/trust score that exceeds a minimum threshold. However, upon achieving such a score, then AAV 162 may become eligible to bid on tasks, may perform solo tasks (if capable), and so on.

The foregoing illustrates just one example of a system in which examples of the present disclosure for assigning a task to a first autonomous vehicle and at least a second autonomous vehicle in response to a bid from the first autonomous vehicle and examples of the present disclosure for a first autonomous vehicle to instruct a second autonomous vehicle to perform at least a part of at least a portion of a task, in response to a bid from at least a second autonomous vehicle may operate. In addition, the foregoing is described in connection with just one example task. However, it will be appreciated that various other tasks that may be performed by at least one AV may be facilitated via the system 100, such as a retrieval of at least one item, a mapping task, an imaging task, a sensor reading task, a visual projection task, a lighting projection task, a search task, a security surveillance task, and so forth.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for assigning a task to a first autonomous vehicle and at least a second autonomous vehicle in response to a bid from the first autonomous vehicle and/or for a first autonomous vehicle to instruct a second autonomous vehicle to perform at least a part of at least a portion of a task, in response to a bid from at least a second autonomous vehicle. Additionally, devices that are illustrated and/or described as using one form of communication (such as a cellular or non-cellular wireless communications, wired communications, etc.) may alternatively or additionally utilize one or more other forms of communication. In still another example, there may be various different fleet management systems with different fleets (although, in one example, some AVs may be members of more than one fleet). For example, a first fleet may be associated with a delivery service provider, a second fleet may be associated with a merchant that manages its own deliveries (such as a grocery store chain), a third fleet may be associated with a security service provider, and so on. In addition, although a task is described as being obtained from a user via user device 141, it should be noted that in other, further, and different examples a task may be similarly obtained from one or more automated devices or processing systems, such as an inventory management system of a store that may automatically request delivery of additional items from a warehouse, a security system detecting an unusual condition via a fixed camera and automatically. Thus, these and other modifications are all contemplated within the scope of the present disclosure.

FIG. 3 illustrates a flowchart of an example method 300 for assigning a task to a first autonomous vehicle and at least a second autonomous vehicle in response to a bid from the first autonomous vehicle. In one example, steps, functions and/or operations of the method 300 may be performed by a device or apparatus as illustrated in FIG. 1, e.g., by one or more of server(s) 125 and/or server(s) 112, or any one or more components thereof, or by server(s) 125 or servers 112, and/or any one or more components thereof in conjunction with one or more other components of the system 100, such as elements of wireless access network 115, telecommunication network 110, mobile device 141, AAVs 160-162, AVs 171-172, and so forth. In one example, the steps, functions, or operations of method 300 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and proceeds to step 310.

At step 310, the processing system obtains a request for a performance of a task, where the task is to be performed by at least one autonomous vehicle. The task may comprise, for example: a delivery of at least one item (broadly transporting an object from point A to point B), a retrieval of at least one item (broadly recovering an object from point A and returning it to point B), a mapping task (broadly mapping a geographical area), an imaging task (broadly imaging a geographical area), a sensor reading task (broadly taking a sensor reading of a geographical area, e.g., sensing a temperature, a wind speed, a humidity, a water level, a motion, and so on), a visual projection task (broadly projecting an image or video into a geographical area), a lighting projection task (broadly illuminating a geographical area with light), a search task (broadly searching for an object, an animal, or an individual in a geographical area), a meter reading task (e.g., broadly reading a meter that is displaying some information, e.g., a gas meter, a water meter, a parking spot meter, etc.), or a security surveillance task (broadly monitoring a geographical area, e.g., capturing images and/or sound with a camera and a microphone), a combination of any of the foregoing, and so on. In one example, the task request may be received from a device of a user of a fleet management system (e.g., comprising the processing system performing the method 300). The user may be an employee or agent of an operator of the fleet management system, or may be a client or customer authorized to submit task request. In another example, the task request may be received from another automated device or processing system, such as an inventory management system of a store that may automatically request delivery of additional items from a warehouse, a security system detecting an unusual condition via a fixed camera and automatically requesting an AV to capture additional video of an area, and so on.

At optional step 315, the processing system may determine a plurality of task requirements for the task. In one example, at least a portion of the task requirements may be obtained with the request. For instance, a package weight or package dimensions given in the request are direct requirements. A task request for LiDAR imaging of an area may be a direct requirement for LiDAR sensors. In one example, optional step 315 may include calculating at least a portion of the task requirements based upon the request, and based upon knowledge of distances, locations, etc. For instance, a task request may provide a task location and a destination location. The processing system may then calculate a distance between the task location (e.g., a start location) and destination location (e.g., an end location), and set this distance as a minimum range requirement. To further illustrate, the plurality of task requirements may comprise one or more of: a task destination location, a security level requirement, a task start time, a task duration, a maneuvering capability, a speed capability, an image capture capability, a lift capacity, a lighting capability, a communication capability, a map possession requirement, a minimum range capability, and so forth. In one particular example, the plurality of task requirements may include a reputation requirement (e.g., a minimum reputation/trust score, or the like) that must be fulfilled by an AV, or AVs that may be assigned to perform the task.

At step 320, the processing system broadcasts an offer for performing the task to a plurality of autonomous vehicles. In one example, the offer for performing the task includes at least a portion of the plurality of task requirements. For instance, the plurality of autonomous vehicles may comprise autonomous vehicles that are registered with the processing system (e.g., those that are part of the fleet/contained in a fleet database). For example, the processing system may comprise a management system for managing a fleet of autonomous vehicles comprising the plurality of autonomous vehicles. In one example, each of the plurality of autonomous vehicles to which the offer is broadcast may be determined to be capable of performing at least a portion of the task based upon reputation information and capability information of each of the plurality of autonomous vehicles. For instance, the processing system may store or have access to a database storing the reputation information and capability information of each of the plurality of autonomous vehicles.

In addition, in one example, the offer for performing the task may include an incentive value (or "value element"). For instance, the incentive value may comprise at least one of: a monetary value, an increase of a reputation score, or a commitment of at least one future task assignment. For example, AVs in the fleet may be independently owned and operated and may accumulate value, such as digital currency held and exchanged via digital wallets of the AVs, knowledge elements or software (e.g., as discussed above), levels of reputation/trust scores, etc. In the case of digital currency, although AVs may have individual digital wallets, in one example, the held values may ultimately accrue to the respective owners and/or operators. In one example, the offer may also include bonus value(s) for certain aspects of task (e.g., finishing on time or early, etc.). It should also be noted that the broadcast of step 320 may comprise cellular communications and/or non-cellular wireless communications, such as LTE or 5G cellular broadcast, IEEE 802.11 based broadcast communications (e.g., Wi-Fi, Wi-Fi Direct broadcast, LTE Direct, Dedicated Short Range Communications (DSRC), e.g., in the 5.9 MHz band, or the like, a 5G device-to-device (D2D) sidelink, such as over a P5 interface, and so forth).

At step 325, the processing system obtains, from a first autonomous vehicle of the plurality of autonomous vehicles, a bid to perform the task by the first autonomous vehicle and at least a second autonomous vehicle. The bid may be obtained via one of the modalities described above, or the like (e.g., Wi-Fi Direct, LTE Direct, DSRC, 5G D2D or V2V, etc.). It should be noted that in one example the at least the second autonomous vehicle may be part of the plurality of autonomous vehicles that is registered with the processing system. In other words, the second autonomous vehicle may be part of the fleet. However, in another example, the second autonomous vehicle may be unknown to the processing system and may not be part of the fleet. In such case, in one example, the bid comprises at least reputation information and capability information of the at least the second autonomous vehicle. For instance, the first autonomous vehicle may obtain and include in the bid reputation information for the second autonomous vehicle that may assist in having the bid accepted and/or obtaining approval from the processing system to perform at least a part of the task. In one example, the first autonomous vehicle and second autonomous vehicle may comprise autonomous aerial vehicles. In another example, the first autonomous vehicle and second autonomous vehicle may each comprise a land or water surface operating autonomous vehicle, a submersible autonomous vehicle, etc. In one example, the first autonomous vehicle and second autonomous vehicle may be of different types.

At optional step 330, the processing system may obtain reputation information and capability information of the at least the second autonomous vehicle. For instance, the first autonomous vehicle and the at least the second autonomous vehicle may coordinate to perform the task, where the at least the second autonomous vehicle is not registered with the processing system. Accordingly, optional steps 325 and 330 may be performed when the at least the second autonomous vehicle is unknown to the processing system. In one example, the reputation information and capability information of the at least the second autonomous vehicle may be obtained in the bid received at step 325. Alternatively, or in addition, the processing system may request or may verify such information directly on its own. For example, reputation information of the at least the second autonomous vehicle obtained in the bid at step 325 may indicate that the at least the second autonomous vehicle previously worked on a collaborative task with a third autonomous vehicle that is part of the fleet (e.g., perhaps in connection with a task for a different fleet management system). In this case, at optional step 330 the processing system may query the third autonomous vehicle to confirm that the asserted reputation and capability information is not inconsistent with the experience of the third autonomous vehicle. In another example, the reputation information may be the first autonomous vehicle attesting that it has performed at least one other task in collaboration with the at least the second autonomous vehicle outside of the management of the processing system, where the first autonomous vehicle has a reputation/trust level with the processing system such that the processing system is willing to accept the assertion of the first autonomous vehicle on behalf of the second autonomous vehicle.

At optional step 335, the processing system may authorize the at least the second autonomous vehicle to perform at least a portion of the task based upon the reputation information and the capability information. For instance, the processing system may verify that the reputation asserted at least complies with minimum requirements for the task, that the at least the second autonomous vehicle has capabilities commensurate with the portion of the task it is intending to perform, etc. The authorization may include a communication to the first autonomous vehicle that the second autonomous vehicle has been authorized.

At optional step 340, the processing system may register the at least the second autonomous vehicle with the processing system, where the registering includes storing the reputation information and the capability information of the at least the second autonomous vehicle (e.g., in a fleet database). In one example, the at least the second autonomous vehicle may be provisionally added, or may be a probationary member of the fleet. In other words, the at least the second autonomous vehicle may be limited to performing collaborative tasks, or may be limited to certain tasks that require a lesser trust/reputation score, etc. However, in one example, the at least the second autonomous vehicle may be enabled to receive at least one additional offer from the processing system to perform at least one additional task after the registering.

At optional step 345, the processing system may select the bid of the first autonomous vehicle from among the plurality of bids. For instance, bids may be competitive and may include a monetary value or other incentive values (e.g., a "value element"), where a low bid may be accepted, but may be weighted based upon reputation or other factors such as timeliness of availability, excess of capability with respect to at least one of the task requirements (e.g., more lifting capacity than strictly required for a load may be looked upon favorably), etc. In one example, AVs that are more trusted (e.g., higher reputation/trust scores) may be favored, even if possibly more expensive that lower bids from AVs having a lower reputation/trust factors. In this regard, AVs can independently make bids by assessing how far away the AVs are from a task location, e.g., those that are already closer may use less battery or fuel that ones that are further away, and thus may be able to give lower bids. In an example where the fleet is managed and fully or mostly owned by the operator of the processing system, the task assignments can be distributed via round robin or weighted round robin such that tasks are roughly allocated evenly over the AVs over time. In addition, in one example, optional step 345 may comprise verifying that the reputation information and the capability information of the at least the second autonomous vehicle matches a plurality of task requirements for the task (e.g., if not already performed at optional steps above).

At step 350, the processing system assigns the task to the first autonomous vehicle and the at least the second autonomous vehicle in response to the bid. For instance, the notification of the assignment of the task may be transmitted to the first autonomous vehicle in a manner as described above.

At optional step 355, the processing system may verify a completion of the task. In one example, the processing system may obtain external verification that the task is completed. For instance, if the task is a delivery of a package, a recipient may mark the package received in a message to a user or system sending the package, or in a message to the fleet management system. If the task is collection of sensor data in an area, the processing system may obtain a confirmation from the user or system that submitted the task that the requested data has been received. Alternatively, or in addition, the processing system may obtain a picture of a delivered package, a copy of a compilation of sensor data that was collected per the task, a copy of a video along a route of the task, etc.

At optional step 360, the processing system may transfer a value element or incentive value per the offer and the accepted bid. For instance, the first autonomous vehicle may possess a digital wallet, where the incentive value (or at least one "value element") comprises a value amount to be credited to the digital wallets. As noted above, the at least one value element may alternatively or additionally comprise at least one knowledge element or a software component. It should be noted that in one example, the processing system may transfer a value element to the second autonomous vehicle based upon the second autonomous vehicle successfully performing its assigned part of the task. For instance, the processing system may obtain information regarding the collaboration agreement between the first autonomous vehicle and the second autonomous vehicle, and in one example may facilitate the transfer of the value element at the end of the task. However, in another example, the value element from the processing system may be transferred to the first autonomous vehicle, where the first autonomous vehicle may further transfer to the second autonomous vehicle any other value element(s) it has agreed to per the agreement to collaborate.

Following step 350, or one of the optional steps 355 or 360, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-360 for additional tasks. In one example, the method 300 may include notifying AVs submitting unselected bids that the bids were not accepted, such that the other AVs may better forecast availability for other tasks. In another example, the method 300 may further include increasing reputation/trust scores for the AVs involved in performing the task (and conversely reducing trust/reputation scores for failure at the task). Thus, these and other modifications are all contemplated within the scope of the present disclosure.

FIG. 4 illustrates a flowchart of an example method 400 for a first autonomous vehicle to instruct a second autonomous vehicle to perform at least a part of at least a portion of a task, in response to a bid from at least a second autonomous vehicle. In one example, steps, functions and/or operations of the method 400 may be performed by one of AAVs 160-162 or AVs 171-172, or any one or more components thereof, or by AAVs 160-162 or AVs 171-172, and/or any one or more components thereof in conjunction with one or more other components of the system 100, such as server(s) 125, server(s) 112, elements of wireless access network 115, telecommunication network 110, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 (e.g., one of AAVs 160-162 or AVs 171-172) that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a first autonomous vehicle) obtains an assignment to perform a task, where the task has a plurality of task requirements. The task may comprise, for example: a delivery of at least one item, a retrieval of at least one item, a mapping task, an imaging task, a sensor reading task, a visual projection task, a lighting projection task, a search task, or a security surveillance task, a combination of any of the foregoing, and so on. The plurality of task requirements may comprise one or more of: a task destination location, a security level requirement, a task start time, a task duration, a maneuvering capability, a speed capability, an image capture capability, a lift capacity, a lighting capability, a communication capability, a map possession requirement, a minimum range capability, and so forth. In one particular example, the plurality of task requirements may include a reputation requirement (e.g., a minimum reputation/trust score, or the like) that must be fulfilled by the first autonomous vehicle (and any others that may collaborate to perform the task). In one example, the assignment may be obtained from a fleet management system, such as described above. In one example, the first autonomous vehicle may comprise an autonomous aerial vehicle. In another example, the first autonomous vehicle may comprise a land or water surface operating autonomous vehicle, a submersible autonomous vehicle, etc.

At step 415, the processing system calculates at least a probability that the first autonomous vehicle will not be able to achieve at least one of the plurality of task requirements. The probability may be calculated before a commencement of the task by the first autonomous vehicle, or after the commencement of the task by the first autonomous vehicle. For instance, the first autonomous vehicle may detect beforehand that it cannot perform the task alone (and may seek an agreement from at least one additional autonomous vehicle per the steps below). In another example, the first autonomous vehicle may accept the task, which it was determined to be capable of performing alone, but for some reason later may determine that it cannot complete the task as assigned. For example, the first autonomous vehicle may project that it will unlikely be able to make the deadline, cannot do some aspects of the task (e.g., at least a portion of the task), etc. The calculation could be due to an unforeseen level of traffic, unforeseen weather, a malfunction of a sensor, loss of charge (and therefore loss of expected range), etc. In still another example, an owner may need to divert the autonomous vehicle to an emergency location such as an accident or to perform another more pressing task, and so forth.

At optional step 420, the processing system may detect a transmission from the second autonomous vehicle indicating an availability of the second autonomous vehicle for collaborative task performance and capability information of the second autonomous vehicle. The transmission from the second autonomous vehicle may further indicate that the second autonomous vehicle is available for collaborative task performance in exchange for the at least one value element. The transmission may comprise a Wi-Fi Direct broadcast, LTE Direct broadcast, a DSRC) broadcast, a 5G device-to-device (D2D) or vehicle-to-vehicle (V2V) sidelink broadcast, such as over a P5 interface, or the like. In one example, the second autonomous vehicle may comprise an autonomous aerial vehicle. In another example, the second autonomous vehicle may comprise a land or water surface operating autonomous vehicle, a submersible autonomous vehicle, etc.

At optional step 425, the processing system may determine that the second autonomous vehicle is capable of performing at least the portion of the task, based upon the capability information of the second autonomous vehicle (and based upon any requirements of at least the portion of the task).

At optional step 430, the processing system may obtain an approval from a fleet management system for the second autonomous vehicle to perform the at least the part of the at least the portion of the task. For instance, the processing system may transmit capability and/or reputation information of the second autonomous vehicle to the fleet management system. The fleet management system may verify this information, or obtain additional information regarding the second autonomous vehicle, and may provide a response indicating whether the second autonomous vehicle is permitted to work on at least the portion of the task.

At step 435, the processing system transmits an offer to at least one additional autonomous vehicle to perform at least a portion of the task, where the offer includes at least one value element. For instance, the processing system may send the offer to the second autonomous vehicle when the processing system determines that the second autonomous vehicle can perform at least the specified part of the task. In one example, the offer may be transmitted via any of the modalities described above, e.g., Wi-Fi Direct, LTE Direct, DSRC, 5G D2D or V2V, etc. In one example, the processing system can send the offer and include the value element in the offer in response to the second autonomous vehicle indicating it is available and willing to work in exchange for the value element. In this case, the second autonomous vehicle may indicate minimum value element(s) it is willing to work for, and then the processing system (of the first autonomous vehicle) may include such value element(s) in the offer to collaborate. In another example, optional steps 425-430 may be omitted. In other words, the processing system may simply broadcast the offer to collaborate, without first detecting a broadcast from any nearby autonomous vehicles indicating a willingness to collaborate.

At optional step 440, the processing system may obtain a bid from the second autonomous vehicle to perform the at least the part of the at least the portion of the task. In one example, the bid includes capability information of the second autonomous vehicle (e.g., if not previously broadcast by the second autonomous vehicle). In one example, the bid further includes reputation information of the second autonomous vehicle (e.g., if not previously broadcast by the second autonomous vehicle). It should again be noted that the bid may be obtained via one of the modalities described above.

At optional step 445, the processing system may verify the reputation information of the second autonomous vehicle. For instance, optional step 445 may comprise transmitting the reputation information and identification information of the second autonomous vehicle to a fleet management system and obtaining a confirmation from the fleet management system of the reputation information of the second autonomous vehicle. For instance, the reputation information may include information identifying at least a third autonomous vehicle that has performed at least one collaborative task with the second autonomous vehicle, where the at least third autonomous vehicle is a member of the fleet that is managed by the fleet management system. Accordingly, the fleet management system may verify the asserted reputation of the second autonomous vehicle by querying the at least the third autonomous vehicle. In one example, optional step 445 may be similar to optional step 430 above (e.g., the difference being the order of verifying with respect to the timing of receiving the bid).

At optional step 450, the processing system may accept the bid from the second autonomous vehicle in response to verifying the reputation information. In one example, the processing system may confirm to the fleet management system that the bid from the second autonomous vehicle is accepted. The fleet management system may further note in a task record that the second autonomous vehicle is collaborating for at least a part of the task. In addition, the second autonomous vehicle may be added to a fleet database and/or a fleet database record for the second autonomous vehicle may be updated to indicate that the second autonomous vehicle is "on task" for the current time or the future time at which the part of the task is scheduled to be performed.

At step 455, the processing system instructs the second autonomous vehicle from among the at least one additional autonomous vehicle to perform at least a part of the at least the portion of the task, in response to a bid from the second autonomous vehicle to perform the at least the part of the portion of the task. The instructions may be sent via one of the modalities described above.

At step 460, the processing system determines that the second autonomous vehicle has completed the at least the part of the at least the portion of the task. For instance, the first autonomous vehicle may accompany the second autonomous vehicle while that part of the task is being performed, and may verify directly that the second autonomous vehicle has fulfilled that part of the task. In another example, the processing system may obtain external verification that the second autonomous vehicle has completed its assigned part of the task. For instance, if the second autonomous vehicle completed a delivery of a package. The recipient may mark the package received in a message to a user or system sending the package, or in a message to the fleet management system. A notification may then be transmitted to the processing system of the first autonomous vehicle that the package was successfully delivered.

At step 465, the processing system exchanges the at least one value element with the second autonomous vehicle in response to determining that the second autonomous vehicle has completed the at least the part of the at least the portion of the task. For example, the first autonomous vehicle and the second autonomous vehicle may possess respective digital wallets, where the at least one value element comprises a value amount to be exchanged via the respective digital wallets. The at least one value element may alternatively or additionally comprise at least one knowledge element, such as a map, information regarding at least one condition of at least one area or along a path (e.g., weather information, traffic information, etc.), information regarding reputation/trust information of at least another autonomous vehicle, or information regarding at least one human encounter (e.g., was the human encounter positive or negative, threat or no threat, etc.). Similarly, the at least one value element may comprise a software component, such as a flight control software, a sensor software, an imaging software, or the like. In one example, the at least one value element may comprise a stored electrical charge (e.g., to be transferred in exchange for assistance with the task). In still another example, the at least one value element may comprise an increase of a reputation score or a security level of the second autonomous vehicle. For instance, the first autonomous vehicle may have a sufficiently high reputation/trust score that it is authorized to increase reputation/trust scores of other autonomous vehicles. In one example, the value element(s) may be exchanged via direct communication between the autonomous vehicles. In another example, the value element(s) may be transferred via a fleet management system or via another network-based system (such as an online banking system, a distributed ledger system for maintaining digital wallets (e.g., a digital currency blockchain network), or the like).

Following step 465, the method 400 may proceed to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-465 for additional tasks. In one example, a bonus for early completion or other factors could be offered as an additional value element. In one example, the at least one value element may also comprise an increase in a security level. For instance, the fleet management system may allow the first autonomous vehicle to offer the second autonomous vehicle a basic security level in exchange for completing the first task. The security level may be different from the reputation/trust score described above and may be a separate factor that is imposed by certain clients/customers of the fleet management system. In still another example, step 410 may follow step 435 or optional step 450. For instance, the processing system may secure the tentative agreement of the second autonomous vehicle to collaborate even before obtaining the actual assignment of the task from the fleet management system. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 or FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components, devices, and/or systems illustrated in FIG. 1 or described in connection with FIGS. 1-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for assigning a task to a first autonomous vehicle and at least a second autonomous vehicle in response to a bid from the first autonomous vehicle or for a first autonomous vehicle to instruct a second autonomous vehicle to perform at least a part of at least a portion of a task, in response to a bid from at least a second autonomous vehicle, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for assigning a task to a first autonomous vehicle and at least a second autonomous vehicle in response to a bid from the first autonomous vehicle or for a first autonomous vehicle to instruct a second autonomous vehicle to perform at least a part of at least a portion of a task, in response to a bid from at least a second autonomous vehicle (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for assigning a task to a first autonomous vehicle and at least a second autonomous vehicle in response to a bid from the first autonomous vehicle or for a first autonomous vehicle to instruct a second autonomous vehicle to perform at least a part of at least a portion of a task, in response to a bid from at least a second autonomous vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

obtaining, by a processing system including at least one processor deployed in a telecommunication network, a request for a performance of a task, wherein the task is to be performed by at least one autonomous vehicle;

determining, by the processing system, a plurality of task requirements for the task, wherein the determining of the plurality of task requirements comprises determining, based on parameters of the request including a start location and a destination location, a minimum range based upon a distance between the start location and the destination location of the task and determining a maneuvering capability requirement based upon a density of a location associated with the task;

broadcasting, by the processing system via at least one cellular base station of the telecommunication network, an offer for performing the task to a plurality of autonomous vehicles within a communication range of the at least one cellular base station, wherein the offer for performing the task includes at least a portion of the plurality of task requirements, wherein the at least the portion of the plurality of task requirements comprises: the minimum range, the maneuvering capability requirement, and a reputation requirement, and wherein the reputation requirement comprises an autonomous vehicle reputation score exceeding a threshold;

obtaining, by the processing system from a first autonomous vehicle of the plurality of autonomous vehicles via the at least one cellular base station, a bid to perform the task by the first autonomous vehicle and at least a second autonomous vehicle;

assigning, by the processing system, the task to the first autonomous vehicle and the at least the second autonomous vehicle in response to the bid;

verifying, by the processing system, a completion of the task by the first autonomous vehicle and the second autonomous vehicle, wherein the first autonomous vehicle and the at least the second autonomous vehicle coordinate to perform the task; and transmitting, by the processing system, a knowledge element to the at least the second autonomous vehicle in response to the verifying.

2. The method of claim 1, wherein the plurality of task requirements further comprises at least one of:

a task origin location;

a task destination location;

a security level requirement;

a task start time;

a task duration;

a speed capability;

an image capture capability;

a lift capacity;

a lighting capability;

a communication capability;

a map possession requirement; or a minimum range capability.

3. The method of claim 1, wherein the at least the portion of the plurality of task requirements is obtained with the request.

4. The method of claim 1, wherein the task comprises at least one of:

a delivery of at least one item;

a retrieval of at least one item;

a mapping task;

an imaging task;

a sensor reading task;

a visual projection task;

a lighting projection task;

a search task;

a meter reading task; or a security surveillance task.

5. The method of claim 1, wherein the bid is one of a plurality of bids, the method further comprising:

selecting the bid from among the plurality of bids.

6. The method of claim 5, wherein the bid comprises at least reputation information and capability information of the at least the second autonomous vehicle, and wherein the selecting comprises verifying that the reputation information and the capability information of the at least the second autonomous vehicle match the plurality of task requirements for the task.

7. The method of claim 1, wherein the plurality of autonomous vehicles comprises autonomous vehicles that are registered with the processing system.

8. The method of claim 7, wherein the processing system is configured to manage a fleet of autonomous vehicles comprising the plurality of autonomous vehicles.

9. The method of claim 7, wherein each of the plurality of autonomous vehicles to which the offer is broadcast is determined to be capable of performing at least a portion of the task based upon reputation information and capability information of each of the plurality of autonomous vehicles.

10. The method of claim 7, wherein the at least the second autonomous vehicle is not registered with the processing system, and wherein the method further comprises:

obtaining reputation information and capability information of the at least the second autonomous vehicle; and authorizing the at least the second autonomous vehicle to perform at least a portion of the task based upon the reputation information and the capability information of the at least the second autonomous vehicle.

11. The method of claim 10, further comprising:

registering the at least the second autonomous vehicle with the processing system, wherein the registering includes storing the reputation information and the capability information of the at least the second autonomous vehicle.

12. The method of claim 11, wherein the at least the second autonomous vehicle is enabled to receive at least one additional offer from the processing system to perform at least one additional task after the registering.

13. The method of claim 1, wherein the offer for performing the task includes an incentive value.

14. The method of claim 13, wherein the incentive value comprises at least one of:

a monetary value;

an increase of a reputation score; or a commitment of at least one future task assignment.

15. The method of claim 13, wherein the first autonomous vehicle and the at least the second autonomous vehicle share the incentive value.

16. A non-transitory computer-readable medium storing instructions which, when executed by a processing system including at least one processor deployed in a telecommunication network, cause the processing system to perform operations, the operations comprising:

obtaining a request for a performance of a task, wherein the task is to be performed by at least one autonomous vehicle;

determining a plurality of task requirements for the task, wherein the determining of the plurality of task requirements comprises determining, based on parameters of the request including a start location and a destination location, a minimum range based upon a distance between the start location and the destination location of the task and determining a maneuvering capability requirement based upon a density of a location associated with the task;

broadcasting, via at least one cellular base station of the telecommunication network, an offer for performing the task to a plurality of autonomous vehicles within a communication range of the at least one cellular base station, wherein the offer for performing the task includes at least a portion of the plurality of task requirements, wherein the at least the portion of the plurality of task requirements comprises: the minimum range, the maneuvering capability requirement, and a reputation requirement, and wherein the reputation requirement comprises an autonomous vehicle reputation score exceeding a threshold;

obtaining, from a first autonomous vehicle of the plurality of autonomous vehicles via the at least one cellular base station, a bid to perform the task by the first autonomous vehicle and at least a second autonomous vehicle;

assigning the task to the first autonomous vehicle and the at least the second autonomous vehicle in response to the bid;

verifying a completion of the task by the first autonomous vehicle and the second autonomous vehicle, wherein the first autonomous vehicle and the at least the second autonomous vehicle coordinate to perform the task; and transmitting a knowledge element to the at least the second autonomous vehicle in response to the verifying.

17. An apparatus comprising:

a processing system including at least one processor; and a computer-readable medium storing instructions which, when executed by the processing system when deployed in a telecommunication network, cause the processing system to perform operations, the operations comprising:

obtaining a request for a performance of a task, wherein the task is to be performed by at least one autonomous vehicle;

determining a plurality of task requirements for the task, wherein the determining of the plurality of task requirements comprises determining, based on parameters of the request including a start location and a destination location, a minimum range based upon a distance between the start location and the destination location of the task and determining a maneuvering capability requirement based upon a density of a location associated with the task;

broadcasting, via at least one cellular base station of the telecommunication network, an offer for performing the task to a plurality of autonomous vehicles within a communication range of the at least one cellular base station, wherein the offer for performing the task includes at least a portion of the plurality of task requirements, wherein the at least the portion of the plurality of task requirements comprises: the minimum range, the maneuvering capability requirement, and a reputation requirement, and wherein the reputation requirement comprises an autonomous vehicle reputation score exceeding a threshold;

obtaining, from a first autonomous vehicle of the plurality of autonomous vehicles via the at least one cellular base station, a bid to perform the task by the first autonomous vehicle and at least a second autonomous vehicle;

assigning the task to the first autonomous vehicle and the at least the second autonomous vehicle in response to the bid;

verifying a completion of the task by the first autonomous vehicle and the second autonomous vehicle, wherein the first autonomous vehicle and the at least the second autonomous vehicle coordinate to perform the task; and transmitting a knowledge element to the at least the second autonomous vehicle in response to the verifying.

18. The apparatus of claim 17, wherein the plurality of task requirements further comprises at least one of:

a task origin location;

a task destination location;

a security level requirement;

a task start time;

a task duration;

a speed capability;

an image capture capability;

a lift capacity;

a lighting capability;

a communication capability;

a map possession requirement; or a minimum range capability.

19. The apparatus of claim 17, wherein the at least the portion of the plurality of task requirements is obtained with the request.

20. The apparatus of claim 17, wherein the task comprises at least one of:

a delivery of at least one item;

a retrieval of at least one item;

a mapping task;

an imaging task;

a sensor reading task;

a visual projection task;

a lighting projection task;

a search task;

a meter reading task; or a security surveillance task.

* * * * *